(12) United States Patent
Lee et al.

(10) Patent No.: US 12,676,957 B2
(45) Date of Patent: Jul. 7, 2026

(54) IMAGE SENSOR AND OPERATING METHOD OF IMAGE SENSOR

(71) Applicant: SAMSUNG ELECTRONICS CO., LTD., Suwon-si (KR)

(72) Inventors: Jeisung Lee, Suwon-si (KR); Hansol Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/934,814

(22) Filed: Nov. 1, 2024

(65) Prior Publication Data

US 2025/0247518 A1 Jul. 31, 2025

(30) Foreign Application Priority Data

Jan. 25, 2024 (KR) ........................ 10-2024-0011722

(51) Int. Cl.
*H04N 17/00* (2006.01)
*H04N 25/447* (2023.01)
*H04N 25/683* (2023.01)
*H04N 25/78* (2023.01)

(52) U.S. Cl.
CPC ......... *H04N 17/002* (2013.01); *H04N 25/447* (2023.01); *H04N 25/683* (2023.01); *H04N 25/78* (2023.01)

(58) Field of Classification Search
CPC .. H04N 17/002; H04N 25/447; H04N 25/683; H04N 25/78
See application file for complete search history.

(56) References Cited

U.S. PATENT DOCUMENTS

| | | | |
|---|---|---|---|
| 10,303,965 B2 | 5/2019 | Schafer et al. | |
| 10,825,149 B2 | 11/2020 | Schafer et al. | |
| 11,100,684 B2 | 8/2021 | Hein et al. | |
| 11,748,862 B2 | 9/2023 | Kim et al. | |
| 2022/0005168 A1* | 1/2022 | Kim ...................... | G06T 7/001 |
| 2022/0182537 A1 | 6/2022 | Kim et al. | |
| 2022/0327664 A1 | 10/2022 | Patil et al. | |
| 2023/0071368 A1 | 3/2023 | Seo et al. | |
| 2024/0163578 A1 | 5/2024 | Roh et al. | |

FOREIGN PATENT DOCUMENTS

| | | |
|---|---|---|
| CN | 112384946 A | 2/2021 |
| CN | 116309343 A | 6/2023 |
| KR | 10-2024-0068414 A | 5/2024 |
| KR | 10-2024-0143549 A | 10/2024 |

* cited by examiner

*Primary Examiner* — James M Pontius
(74) *Attorney, Agent, or Firm* — Sughrue Mion, PLLC

(57) ABSTRACT

Provided are an image sensor and an operating method of the image sensor. The image sensor includes a pixel array configured to convert optical signals that are received, into electrical signals, a readout circuit configured to convert the electrical signals into image data and to output the image data, and a bad-pixel correction circuit configured to correct a cluster bad pixel included in the image data based on a neural network without performing a convolution operation.

20 Claims, 25 Drawing Sheets

Post-Processing

IDTc

Flip

PDTc    PDTp

NN

Neural Network

Pre-Processing

DTin
(12 X 12)

Flip

DTp
(12 X 12)

CBP

PXr    PXb
PXg    BP

FIG. 9

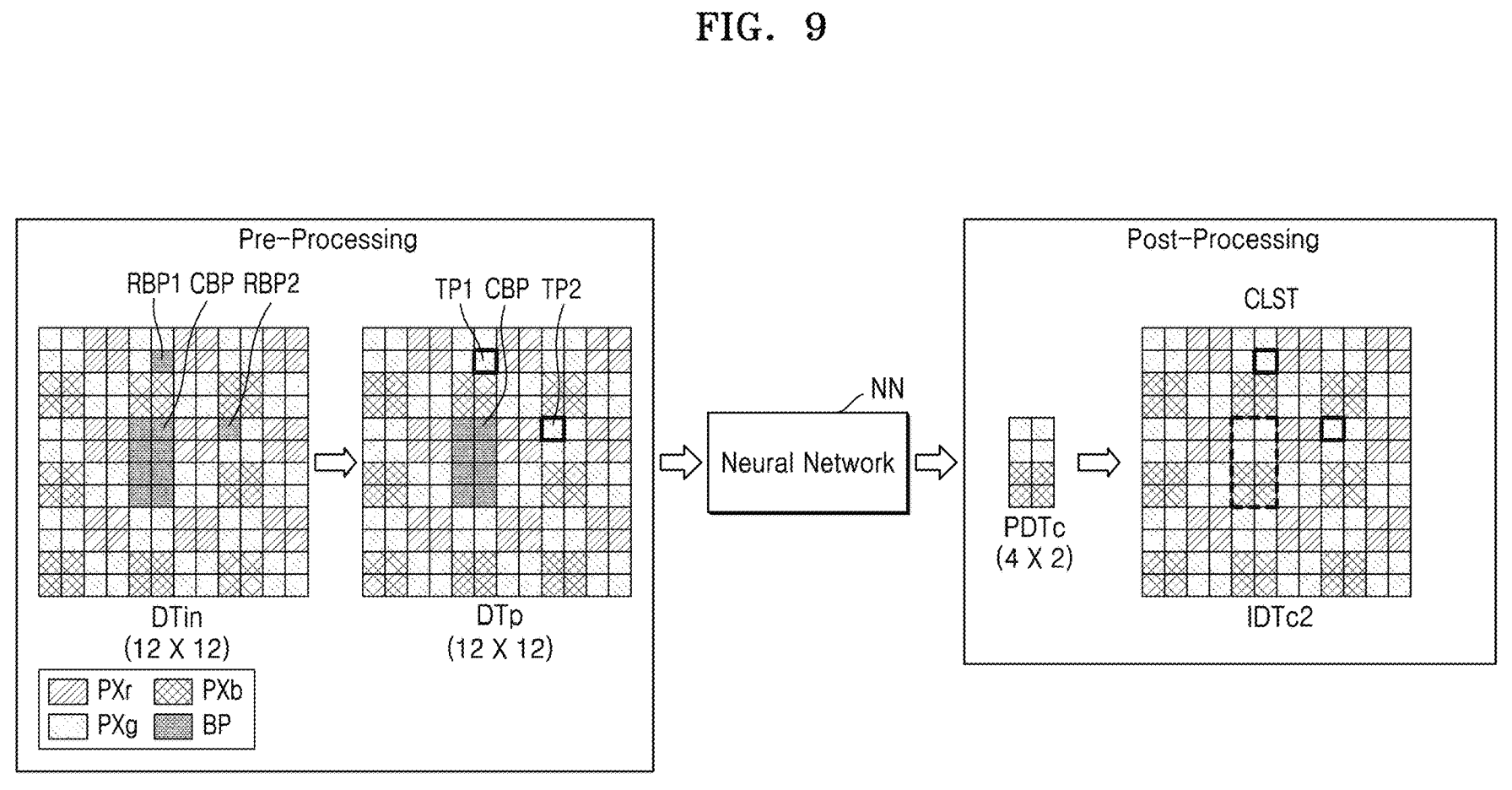

Post-Processing

CLST

IDTc2

PDTc
(4 X 2)

NN

Neural Network

Pre-Processing

TP1 CBP TP2

DTp
(12 X 12)

RBP1 CBP RBP2

DTin
(12 X 12)

PXr    PXb

PXg    BP

IMAGE SENSOR AND OPERATING METHOD OF IMAGE SENSOR

CROSS-REFERENCE TO RELATED APPLICATION

This application is based on and claims priority under 35 U.S.C. § 119 to Korean Patent Application No. 10-2024-0011722, filed on Jan. 25, 2024, in the Korean Intellectual Property Office, the disclosure of which is incorporated by reference herein in its entirety.

BACKGROUND

The present disclosure relates to an image sensor, and in particular, to an image sensor that corrects cluster bad pixels based on deep learning and an operating method of the image sensor.

Recently, the demand for high-quality and high-definition photos and videos has increased, and accordingly, a large number of sensing pixels are integrated into a pixel array to increase the resolution of an image sensor, and the sensing pixels are reduced in size. However, because cluster bad pixels frequently occur at fixed positions in a pixel array due to process issues, technology for correcting the cluster bad pixels is required.

Deep learning technology extracts valid information from input data by using a trained neural network. The deep learning technology may be used to correct cluster bad pixels.

SUMMARY

Aspects of the present disclosure provides an image sensor that corrects cluster bad pixels in real time based on deep learning, and an operating method of the image sensor.

According to an aspect of the disclosure, there is provided an image sensor including: a pixel array configured to convert optical signals into electrical signals; a readout circuit configured to convert the electrical signals into image data and output the image data; and a bad-pixel correction circuit configured to correct a cluster bad pixel included in the image data based on a neural network without performing a convolution operation, the neural network including a plurality of layers.

According to another aspect of the disclosure, there is provided an image sensor including: a pixel array configured to convert optical signals into electrical signals; a readout circuit configured to convert the electrical signals into image data and output the image data, the image data including a plurality of pixel groups each including pixels of a same color arranged in an N×N matrix, and N being an integer of 2 or more; and an image signal processor configured to correct a cluster bad pixel occurring in at least one of the plurality of pixel groups based on a neural network without including a convolutional layer, wherein the neural network includes a plurality of layers.

According to an aspect of the disclosure, there is provided an operating method of an image sensor, the operating method including: generating image data based on an optical signal; detecting a cluster bad pixel in the image data; generating corrected pixel data, by operating a neural network without including a convolutional layer, based on input data including the cluster bad pixel and pixels around the cluster bad pixel; and correcting the cluster bad pixel based on the corrected pixel data, wherein the neural network includes a plurality of layers.

BRIEF DESCRIPTION OF THE DRAWINGS

Embodiments of the disclosure will be more clearly understood from the following detailed description taken in conjunction with the accompanying drawings in which:

FIG. 4 illustrates an example of a neural network model according to an embodiment;

FIGS. 7A, 7B, 7C, and 7D illustrate operations of a bad-pixel corrector according to embodiments;

FIG. 9 illustrate an operation of a bad-pixel corrector according to an embodiment;

FIGS. 10A and 10B illustrate examples of neural network models according to embodiments;

DETAILED DESCRIPTION

Various embodiments are described below in conjunction with the accompanying drawings.

Figure 1:
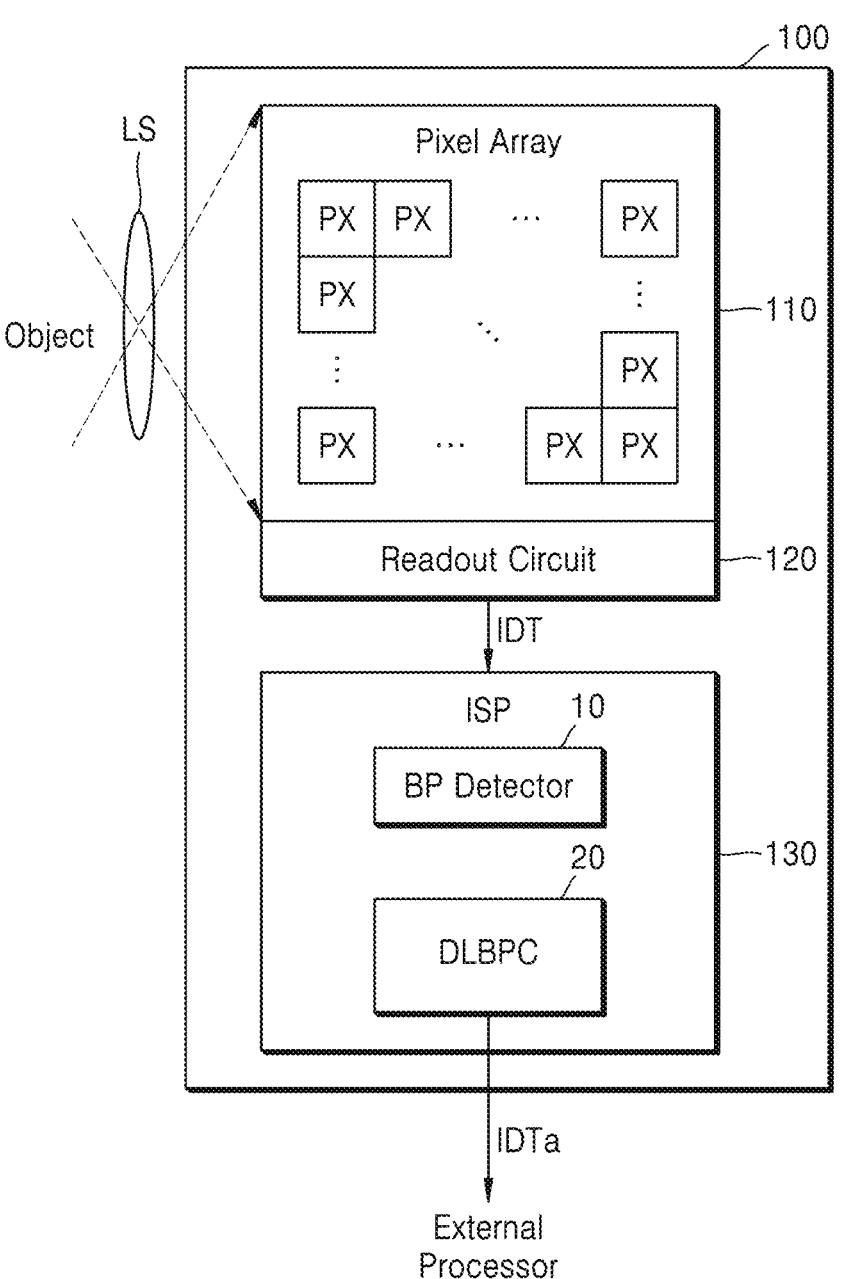
FIG. 1 is a block diagram illustrating an image sensor according to an embodiment.

FIG. 1 is a block diagram illustrating an image sensor according to an embodiment.

FIG. 1 is a block diagram illustrating an image sensor according to an example embodiment.

An image sensor 100 may convert incident light corresponding to an object received through an optical lens LS into image data. The incident light corresponding to the object may be referred to as an optical signal of the object. The image sensor 100 may be mounted in an electronic device having an image or light sensing function. For example, the image sensor 100 may be mounted in an electronic device, such as a digital still camera, a digital video camera, a smartphone, a wearable device, an Internet of Things (IoT) device, a tablet personal computer (PC), a personal digital assistant (PDA), a portable multimedia player (PMP), or a navigation device. Also, the image sensor 100 may be mounted in an electronic device included as a component in a vehicle, furniture, manufacturing facility, a door, or various measurement devices.

Referring to FIG. 1, the image sensor 100 may include a pixel array 110, a readout circuit 120, and an image signal processor (ISP) 130. The image signal processor 130 may include a bad-pixel detector 10 and a bad-pixel corrector 20 (also referred to as a bad-pixel correction circuit). In an embodiment, the pixel array 110, the readout circuit 120, and the image signal processor 130 may be implemented as a single semiconductor chip or a single semiconductor module. In an embodiment, the pixel array 110 and the readout circuit 120 may be implemented as a single semiconductor chip, and the image signal processor 130 may be implemented as another semiconductor chip.

For example, the pixel array 110 may be implemented by a photoelectric conversion device, such as a charge coupled device (CCD) or a complementary metal oxide semiconductor (CMOS). However, the disclosure is not limited thereto, and as such, according to another embodiment, the pixel array 110 may also be implemented by various types of photoelectric conversion devices. The pixel array 110 may include a plurality of pixels PX (e.g., sensing pixels) that convert a received optical signal (e.g., light) into an electrical signal, and the plurality of pixels PX may be arranged in rows and columns. Here, each pixel PX of the pixel array 110 may be a physical configuration including elements and circuits that convert optical signals into electrical signals and may be implemented by an active pixel sensor (APS), and each pixel of image data described below refers to data corresponding to each pixel PX of the pixel array 110.

Each of the plurality of pixels PX of the pixel array 110 may include a light sensing element. For example, the light sensing element may include a photo diode, a photo transistor, a port gate, or a pinned photodiode.

A color filter array may be on an upper portion of the pixel array 110. The color filter array is an array of color filters respectively arranged on upper portions of the plurality of pixels PX to capture color information. A color bandwidth sensed by the pixel PX from the received optical signal may be determined according to the color of a color filter corresponding to the pixel PX of the pixel array 110. For example, the color bandwidth may be referred to as a frequency bandwidth. The color filter array may have various color patterns, and accordingly, the pixel array 110 may have various color patterns. Descriptions thereof are given below with reference to FIGS. 2A and 2B.

Figure 2A:
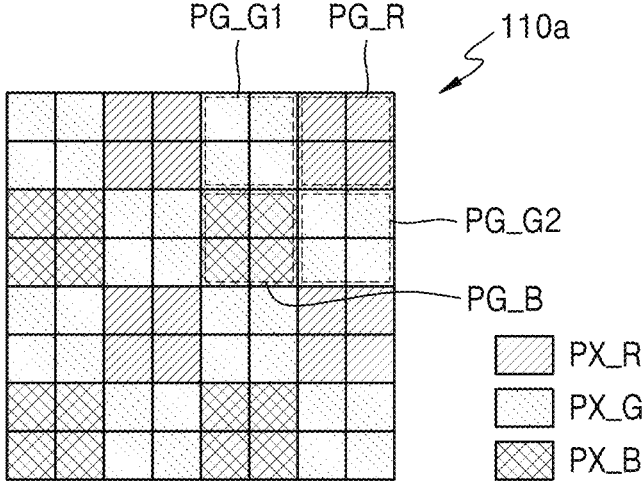
FIGS. 2A and 2B illustrate implementation examples of pixel arrays applied to an image sensor according to an embodiment.
Figure 2B:
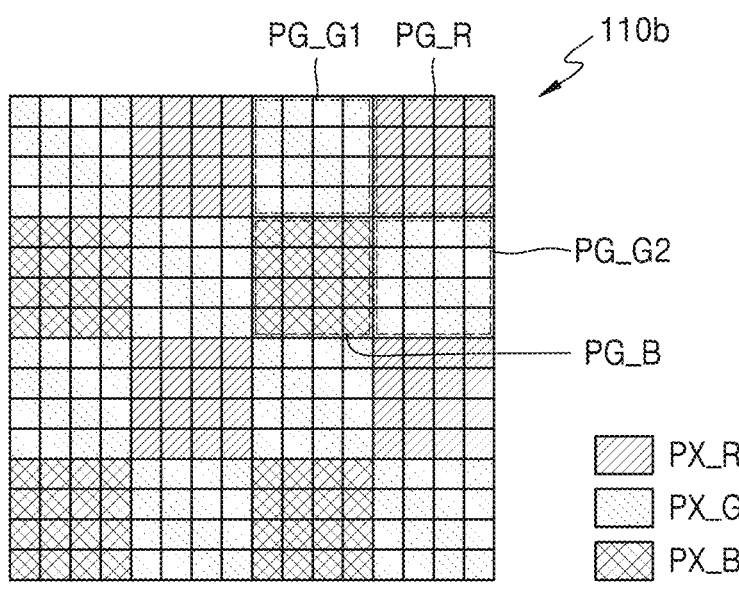

FIGS. 2A and 2B illustrate implementation examples of pixel arrays applied to an image sensor according to an embodiment.

Referring to FIGS. 2A and 2B, pixel arrays 110a and 110b may each include a super Bayer pattern. A Bayer pattern may refer to a pattern in which a red pixel PX_R, a green pixel PX_G, and a blue pixel PX_B are alternately arranged such that green is 50%, red is 25%, and blue is 25% according to human visual characteristics that are most sensitive to the green. The super Bayer pattern may include a red pixel group PG_R, a blue pixel group PG_B, a first green pixel group PG_G1, and a second green pixel group PG_G2 each including identical color pixels that mimic the arrangement of the Bayer pattern. Here, the first green pixel group PG_G1 refers to a green pixel group in the same column as the red pixel group PG_R, and the second green pixel group PG_G2 refers to a green pixel group in the same column as the blue pixel group PG_B.

Referring to FIG. 2A, the red pixel group PG_R, the blue pixel group PG_B, the first green pixel group PG_G1, and second green pixel group PG_G2 may each include color pixels PX of two rows and two columns (hereinafter referred to as a 2×2 matrix). For example, four red pixels PX_R arranged in a 2×2 matrix may be arranged diagonally with four blue pixels PX_B arranged in a 2×2 matrix, and four green pixels PX_G arranged in a 2×2 matrix may be arranged diagonally with another four green pixels PX_G arranged in a 2×2 matrix. However, the disclosure is not limited thereto, and as such, according to another embodiment, the number of pixels in a pixel group may be different than four.

In an embodiment, four pixels PX in a pixel group may share a floating diffusion node. Each of the four pixels PX may include a photo diode and a transfer transistor that transmit charge generated from the photo diode to the floating diffusion node, and the transfer transistors of the four pixels PX may be connected to the same floating diffusion node. In this way, a pixel structure in which a plurality of pixels share one floating diffusion node may be referred to as a shared pixel structure.

In an embodiment, eight pixels PX in a pixel group adjacent to each other in a column direction may share the floating diffusion node. For example, pixels PX of the first green pixel group PG_G1 and the blue pixel group PG_B adjacent to the first green pixel group PG_G1 in the column direction share a floating diffusion node, and the red pixel group PG_R and the second green pixel group PG_G2 adjacent to the red pixel group PG_R in the column direction may share a floating diffusion node.

Referring to FIG. 2B, the red pixel group PG_R, the blue pixel group PG_B, the first green pixel group PG_G1, and the second green pixel group PG_G2 may each include sixteen color pixels PX arranged in a 4×4 matrix. For example, sixteen red pixels PX_R arranged in a 4×4 matrix may be arranged diagonally with sixteen blue pixels PX_B arranged in a 4×4 matrix, and sixteen green pixels PX_G arranged in a 4×4 matrix may be arranged diagonally with another sixteen green pixels PX_G arranged in a 4×4 matrix.

In an embodiment, some or all of the pixels PX in the same pixel group may share a floating diffusion node. For example, eight pixels PX arranged on the left of a pixel group may share a floating diffusion node, and eight pixels PX arranged on the right may share another floating diffusion node. Alternatively, sixteen pixels PX in a pixel group may share a floating diffusion node.

The super Bayer pattern is described above with reference to FIGS. 2A and 2B. FIGS. 2A and 2B respectively illustrate that the red pixel group PG_R, the blue pixel group PG_B, first green pixel group PG_G1, and the second green pixel group PG_G2 are each include pixels PX of the same color arranged in 2×2 matrix and that each pixel group includes pixels PX of the same color arranged in a 4×4 matrix. However, the disclosure is not limited thereto, and as such, according to another embodiment, in various Super Bayer patterns, a pixel group may include pixels PX of the same color arranged in an N×N matrix (N is an integer of 2 or more). Also, in an embodiment, a combination of the red, blue, and green of a pixel array may be changed to a combination of other colors. For example, the red, blue, and green may be replaced with cyan, magenta, and yellow.

Referring back to FIG. 1, the readout circuit 120 may convert electrical signals received from the pixel array 110 into image data IDT. The readout circuit 120 may perform one or more operations on the electrical signals to generate the image data IDT. For example, the readout circuit 120 may amplify the electrical signals and perform analog-to-digital conversion of the amplified electrical signals. The image data IDT generated by the readout circuit 120 may include pixel values respectively corresponding to the pixels PX of the pixel array 110. The readout circuit 120 may be referred to as a sensing core together with the pixel array 110.

The image signal processor 130 may perform image processing of the image data IDT output from the read-out circuit 120 and output image-processed image data IDTa to an external processor. For example, the external processor may include, but is not limited to, an application processor.

The image signal processor 130 may perform bad-pixel correction on the image data IDT. In addition, the image signal processor 130 may perform image processing, such as noise removal, re-mosaic, and binning on the image data IDT.

The bad-pixel detector 10 may detect (or determine) a bad pixel from the image data IDT and detect (or determine) the type of the bad pixel. The bad pixel may include a static bad pixel and a dynamic bad pixel. The static bad pixel may be caused by physical damage to the pixel PX which occurs during a production or manufacturing process of the image sensor 100 (see FIG. 1) and may be checked in advance during manufacturing and test processes of the image sensor 100. An occurrence position of the static bad pixel in the image data IDT may be detected in advance in a test process and stored in advance in a memory in the image sensor 100. The static bad pixel may include a cluster bad pixel and a random bad pixel. The cluster bad pixel refers to a plurality of bad pixels forming a cluster, and the random bad pixel refers to one bad pixel or a plurality of bad pixels isolated from each other. According to an embodiment, the cluster bad pixel may be referred to as a cluster of bad pixels.

The dynamic bad pixel is a bad pixel that occurs unexpectedly during an operation of the image sensor 100 and may be detected after generation of the image data IDT because unfixed position thereof.

The bad-pixel corrector 20 may correct cluster bad pixels based on a neural network. In an embodiment, the bad-pixel corrector 20 may correct bad pixels based on deep learning and may be referred to as a deep learning-based bad-pixel corrector (DLBPC).

In an embodiment, a neural network model applied to the bad-pixel corrector 20 may include a plurality of layers excluding a convolutional layer. For example, the plurality of layers may not include a convolution operation. For example, the neural network model implementing the bad-pixel corrector 20 may not include any layers that perform a convolution operation. The plurality of layers may include, but is not limited to, fully connected layers, a pooling layer, an activation layer, a flattening layer, and so on.

Figure 3A:
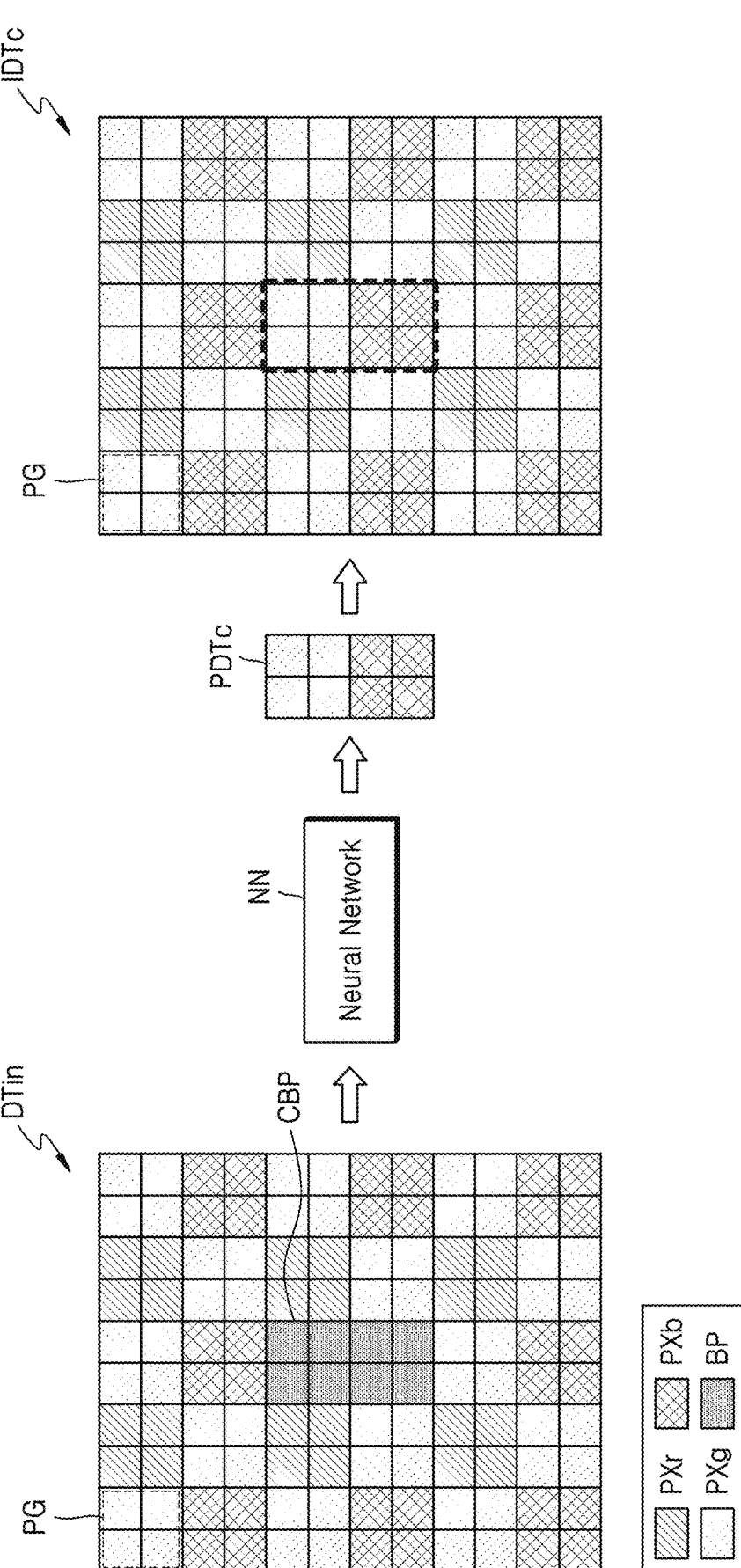
FIGS. 3A and 3B illustrate operations of a bad-pixel corrector provided in an image sensor, according to an embodiment.
Figure 3B:
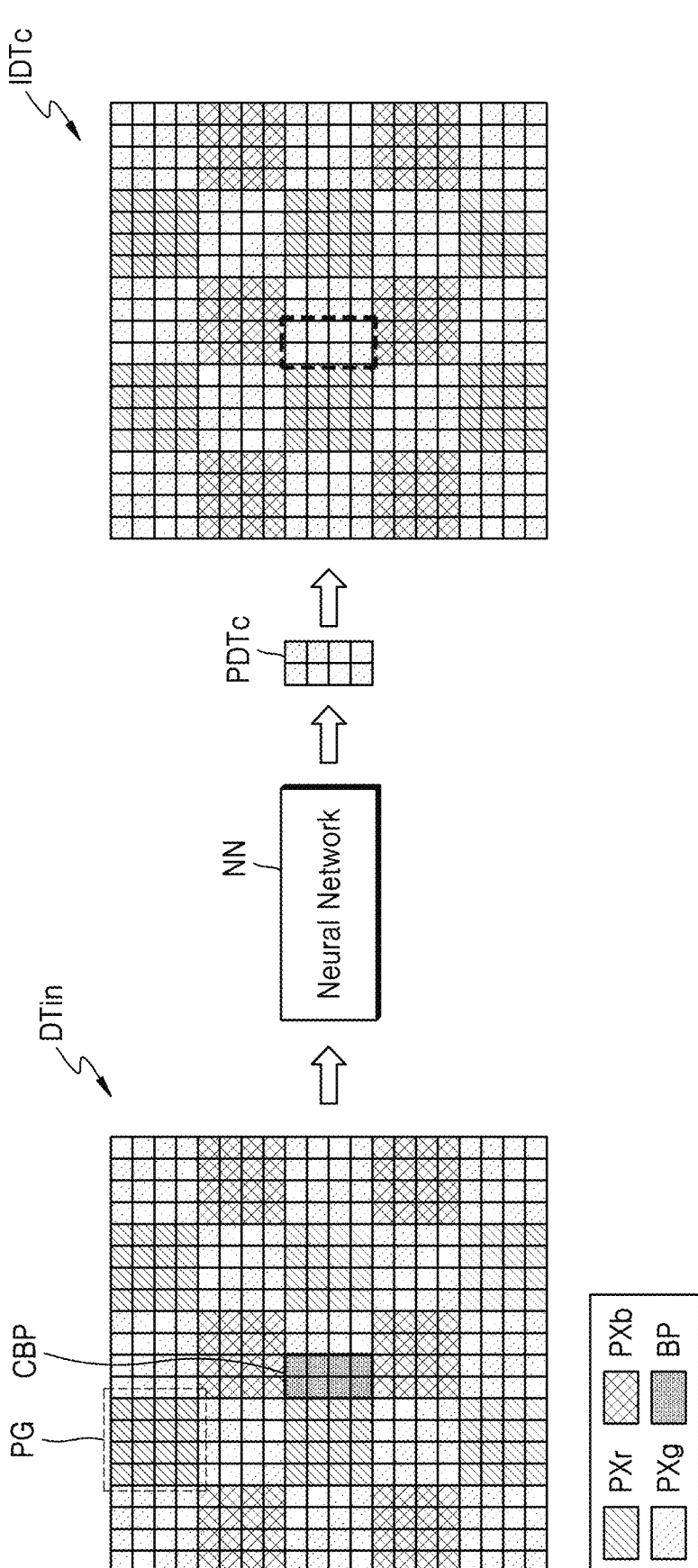

FIGS. 3A and 3B illustrate operations of a bad-pixel corrector provided in an image sensor, according to an embodiment.

Referring to FIGS. 3A and 3B, the bad-pixel corrector 20 (see FIG. 1) may include a neural network NN. The neural network NN may include a deep learning model (e.g., a neural network model) trained to correct a cluster bad pixel CBP and generate corrected pixel data PDTc corresponding to the cluster bad pixel CBP. For example, based on input data DTin including the cluster bad pixel CBP, the neural network NN may correct the cluster bad pixel CBP and generate the corrected pixel data PDTc corresponding to the cluster bad pixel CBP.

In FIG. 3A, the image data IDT (see FIG. 1) may include a super Bayer pattern, and the pixel group PG may include pixels of the same color arranged in a 2×2 matrix, such as red pixels PXr, blue pixels PXb, and green pixels PXg. However, the disclosure is not limited thereto, and as such, according to another embodiment, the image data IDT may include a pattern different from a super Bayer pattern.

In an embodiment, the cluster bad pixel CBP may include bad pixels BP that are included in two pixel groups PG adjacent to each other in the column direction and arranged in a 4×2 matrix. As illustrated in FIG. 3A, four green pixels PXg and four red pixels PXr may be bad pixels BP, and the bad pixels BP arranged in the 4×2 matrix may be referred to as the cluster bad pixels CBP. However, the disclosure is not limited thereto, and the cluster bad pixel CBP may have a different arrangement or a different shape.

The bad-pixel corrector 20 may generate the input data DTin including the cluster bad pixels CBP and input the input data DTin to the neural network NN. The input data DTin may include the cluster bad pixel CBP and a plurality of pixel groups PG arranged around the cluster bad pixel CBP. The cluster bad pixel CBP may be in the center of the input data DTin. For example, the input data DTin may include 30 pixel groups PG arranged in a 6×5 matrix as illustrated in FIG. 3A. That is, the input data DTin may include the pixels PX arranged in a 12×10 matrix. However, the disclosure is not limited thereto, and the size of the input data DTin may be changed.

The neural network NN may generate the corrected pixel data PDTc by processing the input data DTin. The corrected pixel data PDTc may include pixel values respectively corresponding to the bad pixels BP included in the cluster bad pixel CBP. The cluster bad pixel CBP in the image data IDT may be replaced with the corrected pixel data PDTc. That is, the pixel values included in the corrected pixel data PDTc may be applied as pixel values of pixels corresponding to the cluster bad pixel CBP of the image data IDT (see FIG. 1) including the input data DTin. Accordingly, the corrected image data IDTc may be generated.

In FIG. 3B, the image data IDT (see FIG. 1) may include a super Bayer pattern, and the pixel group PG may include pixels of the same color arranged in a 4×4 matrix, such as the red pixels PXr, the blue pixels PXb, and the green pixels PXg.

In an embodiment, bad pixels that are arranged in a 4×2 matrix and included in the pixel group PG may be referred to as the cluster bad pixels CBP.

The neural network NN may generate the corrected pixel data PDTc by processing the input data DTin. The corrected pixel data PDTc may include pixel values respectively corresponding to the bad pixels BP included in the cluster bad pixels CBP. The corrected pixel data PDTc may include pixel values of the green pixels PXg. The cluster bad pixel CBP in the image data IDT may be replaced with the corrected pixel data PDTc. Accordingly, the corrected image data IDTc may be generated.

Referring back to FIG. 1, before operation of the neural network NN, the bad-pixel corrector 20 may perform pre-processing on the input data to convert the input data into the pre-processed input data that may be processed by the neural network. In addition, the bad-pixel corrector 20 may generate the corrected pixel data based on the pre-processed input data and then perform post-processing corresponding to the pre-processing in the corrected pixel data or image data to which the corrected pixel data is applied.

For example, the neural network NN may be trained to generate corrected pixel data from input data including a clustered bad pixel, where the clustered bad pixel includes pad pixels in an M×K matrix. Here, M may be an integer of 2 or more, and K may be an integer of 2 or more. However, in an example case in which the input data includes bad pixels that may not be processed by the neural network the bad-pixel corrector 20 may pre-process the input data such that the input data may be processed by the neural network NN. The example case in which the input data includes the bad pixels that may not be processed by the neural network may include, but is not limited to, a case in which the input data includes other cluster bad pixel including bad pixels arranged in an K×M matrix, a case in which at least one of pixels in a cluster of a M×K matrix forming the cluster bad pixel are valid pixels rather than bad pixels, or a case in which there are random bad pixels around the cluster bad pixel.

For example, the bad-pixel corrector 20 may perform processing, such as flip, transpose, or so on, on the input data. In an example case in which a valid pixel is included in a cluster, the bad-pixel corrector 20 may remove the valid pixel. That is, the valid pixel may be treated as an invalid pixel. In an example case in which there is a random bad pixel around a cluster bad pixel, the bad-pixel corrector 20 may temporarily correct the random bad pixel based on pixels around the random bad pixel.

In an embodiment, the bad-pixel corrector 20 may divide the input data including cluster bad pixels into N sub-input data including pixels at the same position in each pixel group, and may process the N sub-input data in parallel. For example, the neural network NN may include N sub-networks, and the N sub-networks may be operated based on N sub-input data.

In an embodiment, the bad-pixel corrector 20 may be implemented as hardware. For example, calculation circuits corresponding to a plurality of layers of the neural network NN may be implemented as hardware, and calculation parameters, for example, weights applied to respective layers, may be stored in memory and then applied during calculation or operation of the corresponding layer. However, the disclosure is not limited thereto, and as such, according to another embodiment, the bad-pixel corrector 20 may be implemented in software or a combination of hardware and software.

The image-processed image data IDTc may be provided to an external processor. The external processor may include but is not limited to, a main processor, a graphics processor, or so on, of an electronic device in which the image sensor 100 is mounted. The external processor may perform image processing on the image data IDTa to increase image quality or reduce the resolution of the image data IDTa, and may store the image-processed image data, display the image-processed image data on a display, or provide the image-processed image data to a configuration that performs an operation based on the image data IDTa.

In image processing based on the neural network NN, a convolutional neural network (CNN) based on a convolution operation is mainly used. The CNN may extract characteristics abstracted from image data through a kernel-based convolution operation on adjacent pixels. However, the convolutional layer is more complex in operation than other layers and requires a large operation amount.

In addition, because a cluster bad pixel occurs in a local part of the image data IDT, there is low need to extract the characteristics abstracted from the image data. In addition, as described with reference to FIGS. 2A and 2B, pixels of various colors, such as pixels of red, green, and blue, are repeated in the image data IDT generated from the pixel arrays 110a and 110b based on the Super Bayer pattern, and accordingly, high-frequency components due to boundaries between colors may interfere with extraction of characteristics from a kernel of the CNN.

As described above, a neural network model applied to the bad-pixel corrector 20 according to an embodiment may include a plurality of layers excluding a convolutional layer, and as such, correction performance of cluster bad pixels may be improved, and the large operation amount may be reduced. For example, the plurality of layers may include a fully connected layer. Also, the bad-pixel corrector 20 may convert the input data into input data in a form that may be processed by the neural network NN through pre-processing on the input data in response to various cases of input data including a cluster bad pixel. After the neural network NN is trained based on training data of a specific case, the neural network NN may be applied to input data of various cases, and accordingly, the neural network may be reduced in size. Accordingly, real-time processing of the image signal processor 130 may be facilitated, and power consumption of the image sensor 100 may be reduced.

Figure 4:
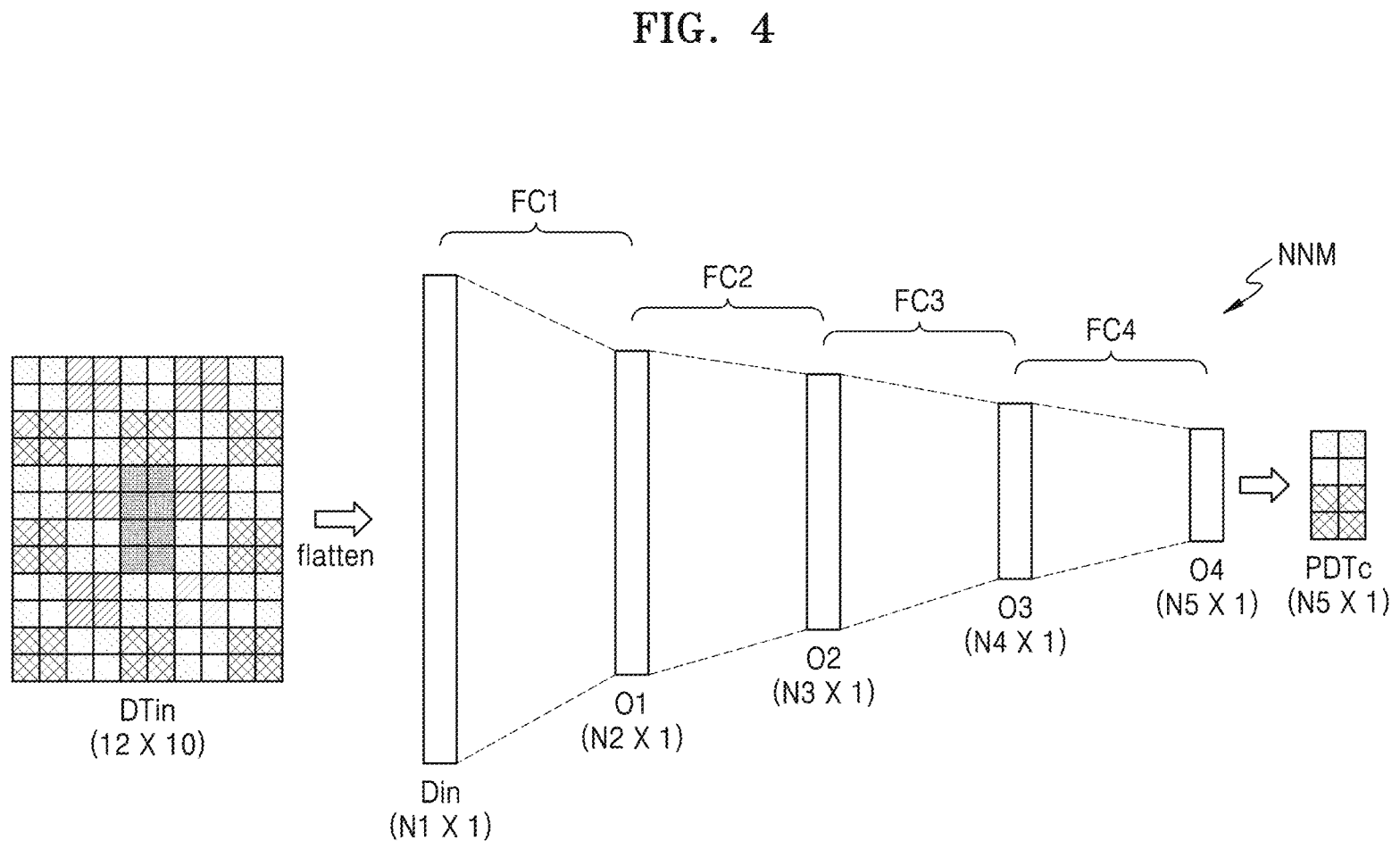

FIG. 4 illustrates an example of a neural network model according to an embodiment. A neural network model NNM illustrated in FIG. 4 may be applied to the bad-pixel corrector 20 (see FIG. 1) according to an embodiment.

Referring to FIG. 4, the neural network model NNM may include a plurality of layers. The plurality of layers do not include a convolutional layer, and the plurality of layers include a plurality of fully connected layers. For example, the plurality of layers may include a first fully connected layer FC1, a second fully connected layer FC2, a third fully connected layer FC3, and a fourth fully connected layer FC4. A multi-layered neural network NN including may be referred to as a deep neural network (DNN) or deep learning architecture. The neural network model NNM may further include, but is not limited to, other layers, such as a pooling layer, an activation layer, a flattening layer, and so on.

The input data DTin, for example, pixels PX arranged in a 12×10 matrix, may include bad pixels in a 4×2 matrix (four rows and two columns). The bad pixels in the 4×2 matrix may be referred to as a cluster bad pixel. The input data DTin may be flattened to be generated as a one-dimensional vectorized network input Din. A network input Din may include data of an N1×1 matrix (or a 1×N1 matrix). Here, N1 may be a positive integer less than 120. For example, the network input Din may include pixel data of valid pixels excluding bad pixels and may include pixel values of pixels arranged in a 118×1 matrix. However, the disclosure is not limited thereto, and as such, N1 may be greater than 120.

The fully connected layer may generate a one-dimensional output including a plurality of output values (for example, pixel values) by multiplying the received one-dimensional input by a weight matrix. In an embodiment, the fully connected layer may apply an activation function to the result of multiplication of the weight matrix. The output may be an input of the next fully connected layer.

For example, the first fully connected layer FC1 may generate a first output O1 based on the network input Din and a first kernel. The first output O1 may include pixel values of pixels in an N2×1 matrix by performing matrix multiplication of the network input Din including pixel values of pixels in an N1×1 matrix and a first kernel including weight values of an N2×N1 matrix. Here N2 is a positive integer.

For example, the second fully connected layer FC2 may generate a second output O2 based on the first output O1 and a second kernel. The second output O2 may include pixel values of pixels in an N3×1 matrix by performing matrix multiplication of the first output O1 including pixel values of pixels in an N2×1 matrix and the second kernel including weight values of an N3×N2 matrix. Here N3 is a positive integer.

For example, the third fully connected layer FC3 may generate a third output O3 based on the second output O2 and a third kernel. The third output O3 may include pixel values of pixels in an N4×1 matrix by performing matrix multiplication of the second output O2 including pixel values of pixels in an N3×1 matrix and the third kernel including weight values of an N4×N3 matrix. Here N4 is a positive integer.

For example, the fourth fully connected layer FC4 may generate a fourth output O4 based on the third output O3 and a fourth kernel. The third output O3 may include pixel values of pixels in an N5×1 matrix by performing matrix multiplication of the third output O3 including pixel values of pixels in an N4×1 matrix and the fourth kernel including weight values of an N5×N4 matrix. Here N5 is a positive integer. For example, N5 may be 8.

The fourth output O4 including pixel values of pixels in an N5×1 matrix may be converted into corrected pixel data PDTc including pixel values of pixels in an N5×1 matrix.

Although FIG. 4 illustrates that the neural network model NNM includes four fully connected layers FC1 to FC4, this is an example, and the disclosure is not limited thereto. For example, the number of fully connected layers may be changed or may be different than four. In an embodiment, the neural network model NNM may have a residual connection. For example, some of the first to fourth fully connected layers FC1 to FC4 may be bypassed. In an embodiment, a pruning technique may be applied to some of the first to fourth fully connected layers FC1 to FC4.

Figure 5A:
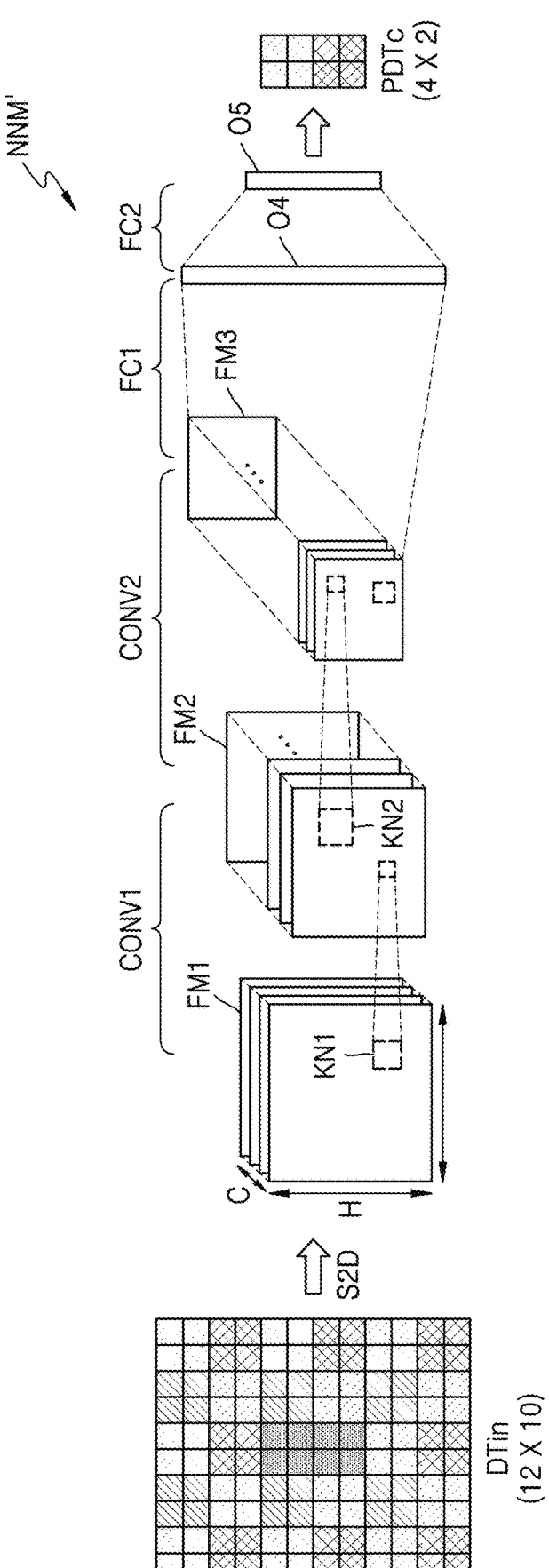
FIG. 5A illustrates an example of a neural network model according to a comparative example.

FIG. 5A illustrates an example of a neural network model according to a comparative example of the disclosure.

Referring to FIG. 5A, a neural network model NNM' according to a comparative example may include one or more convolutional layers and one or more fully connected layers. For example, the neural network model NNM' may include a first convolutional layer CONV1, a second convolutional layer CONV2, a first fully connected layer FC1 and a second fully connected layer FC2. The neural network model NNM' may further include, but is not limited to, a pooling layer, an activation layer, and so on.

Input data DTin may be converted to space to depth (S2D) to be generated as a first feature map FM1. The convolutional layer may generate an output feature map by performing a convolution operation on a kernel (or referred to as a weight map) including a plurality of weights for an input feature map. The feature map refers to data expressing abstract characteristics of input data, and each feature map may have the form of a two-dimensional or three-dimensional matrix (or tensor) including a plurality of feature values. The feature map may have a height H (or a row), a width W (or a column), and a channel count C, and the channel count C may be referred to as a depth.

The first convolutional layer CONV1 may generate a second feature map FM2 by performing convolution of a first feature map FM1 and a first kernel KN1. For example, the first kernel KN1 may include a plurality of weights and may have the form of a two-dimensional or three-dimensional matrix. A kernel may filter an input feature map and be referred to as a filter. A channel count of the kernel, for example, the first kernel KN1, may be equal to a channel count of an input feature map, for example, the first feature map FM1, and convolution of the same channels of the input feature map and the kernel may be performed.

The first kernel KN1 may be shifted by traversing the first feature map FM1 as a sliding window. During each shift, each of the weights included in the first kernel KN1 may be multiplied by and added to all feature values in a region overlapping the first feature map FM1. As convolution of the first feature map FM1 and the first kernel KN1 is performed, one channel of the second feature map FM2 may be generated. A kernel count may be equal to the channel count of an output feature map, for example, the second feature map FM2. For example, by performing convolution of eight first kernels KN1 and the first feature map FM1 in the first convolutional layer CONV1, the second feature map FM2 including eight channels may be generated. The second convolutional layer CONV2 may generate a third feature map FM3 by performing convolution of the second feature map FM2 and a weight map, for example, one or more second kernels KN2.

Similar to the illustration in FIG. 4, the fully connected layer, for example, the first fully connected layer FC1 of FIG. 5A may generate one-dimensional fourth output O4 including a plurality of pixel values by matrix-multiplying an input obtained by flattening a received feature map, for example, the third feature map FM3, and vectorizing one-dimensionally the received feature map, by a third kernel including a plurality of weight values. The second fully connected layer FC2 may generate a one-dimensional fifth output O5 including a plurality of pixel values by matrix-multiplying the fourth output O4 by a fourth kernel including a plurality of weight values. For example, the fifth output O5 may include pixel value of pixel arranged in a 8×1 matrix. The fifth output O5 may be converted into corrected pixel data PDTc including pixel values of pixels arranged in an N5×1 matrix.

Figure 5B:
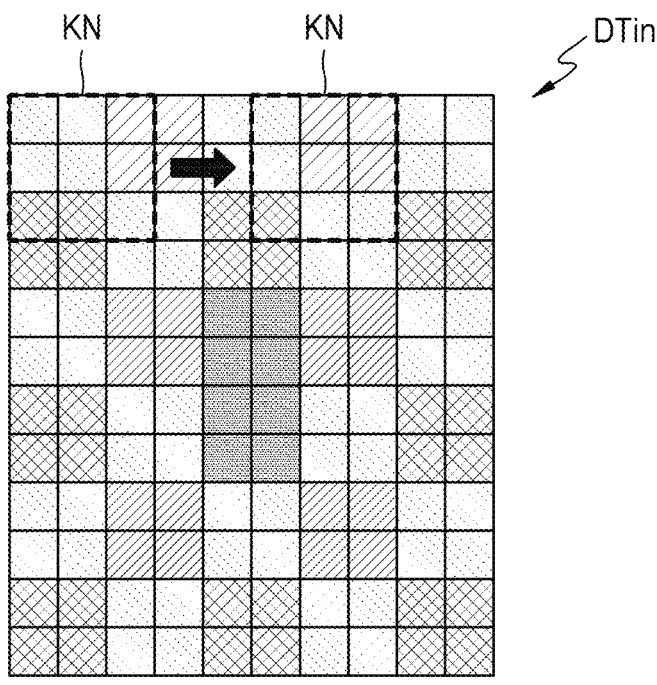
FIG. 5B illustrates an example in which a kernel is applied to data input to a convolutional layer of FIG. 5A.

FIG. 5B illustrates an example in which a kernel is applied to the data input to a convolutional layer of FIG. 5A. The input data DTin includes repeated pixels of various colors, for example, repeated pixels of red, green, and blue colors. A kernel, for example the first kernel KN1 or the second kernel KN2, is shifted by traversing the feature map input to the convolutional layer, for example, the input data DTin as a sliding window. In this case, colors are different for each position of the kernel, and high-frequency components due to boundaries between colors may interfere with extraction of characteristics in the kernel. For example, in an output feature map, the high-frequency components due to boundaries between colors may be highlighted more strongly than image information.

The neural network model NNM according to the embodiment in FIG. 4 does not include first and second convolutional layers of the neural network model NNM' according to the comparative example, and may be implemented with fully connected layers. Accordingly, cluster bad-pixel correction performance may be improved, and also, the neural network model NNM does not include convolutional layers that require relatively more operations than other types of layers, and thus, an operation amount of the neural network model NNM may be reduced.

Figure 6:
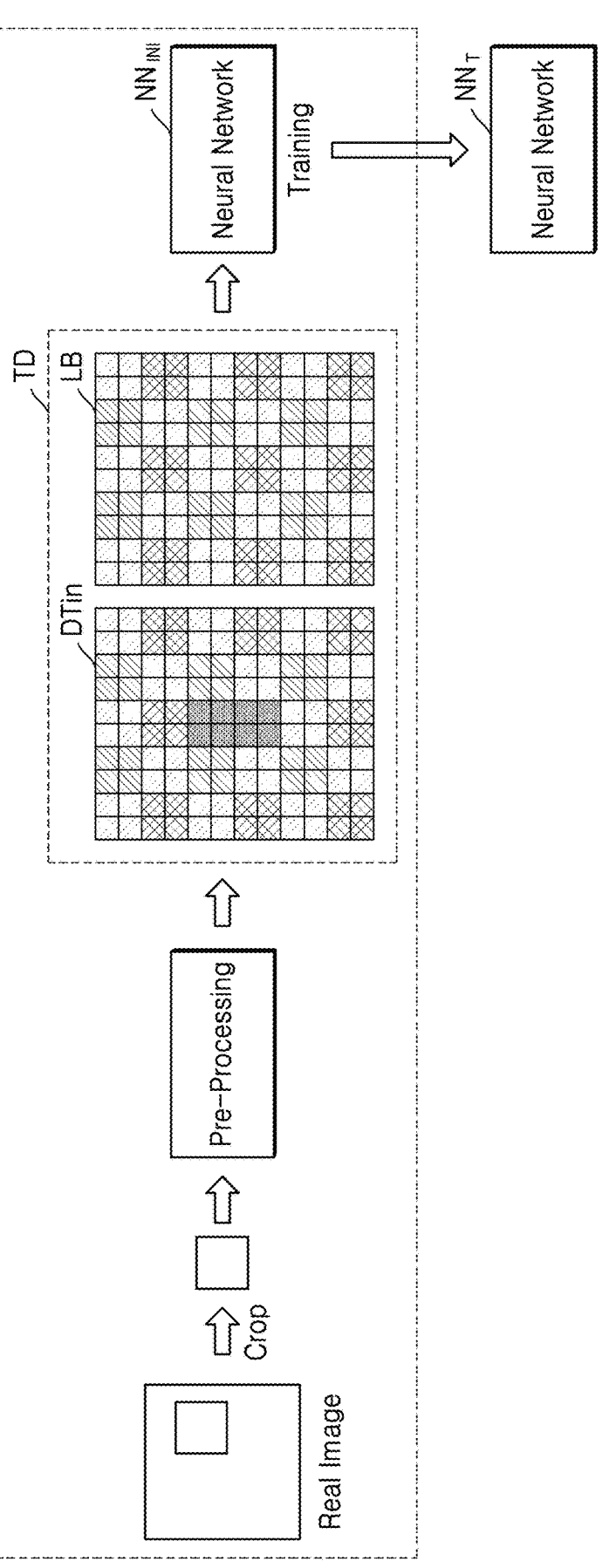
FIG. 6 illustrates training of a neural network according to an embodiment.

FIG. 6 illustrates training of a neural network according to an embodiment.

Referring to FIG. 6, training may be performed on an initial neural network $NN_{INI}$ based on a real image. For example, the real image may be an image obtained by an imaging device. The initial neural network $NN_{INI}$ may include untrained operation parameters. For example, untrained operation parameters, in which, parameters determined by training are set as default values. For example, the untrained operation parameters may include, but is not limited to, weights, biases, and so on, The real image may be prepared, and a part of real image may be cropped. A pre-processing operation may be performed on the cropped image. For example, the pre-processing operation may include, but is not limited to, noise addition, bad pixel implantation, and so on.

Training data TD may be generated through the pre-processing. The training data TD may include input data DTin including a cluster bad pixel and a label LB that does not include the cluster bad pixel. The training data TD may include a plurality of pairs of input data DTin and labels LB. An initial neural network $NN_{INI}$ may be trained based on the training data TD. Accordingly, a trained neural network $NN_T$ may be generated. The trained neural network $NN_T$ may include a neural network model (a deep learning model) trained to correct cluster bad pixels, and the neural network model may include operation parameters obtained through training. The trained neural network $NN_T$ may be applied to the bad-pixel corrector 20 of the image sensor 100 (see FIG. 1).

In an embodiment, the training may include a first training process and a second training process. The first training process may include generating a first neural network by training the initial neural network $NN_{INI}$ based on the first training data generated by using a synthesized image, and the second training process may include generating the neural network NN by training the first neural network generated in the first training based on the second training data generated by using the actual image as described above.

In the first training process, a part of the synthetic image including a simple image, such as a circle, a triangle, or a square may be cropped, and pre-processing is performed on the cropped image to generate the first training data. Pre-processing of the first training process may include a point spread function (PSF) convolution, noise addition, and bad pixel implantation. The initial neural network $NN_{INI}$ may be trained based on the first training data generated by using a synthesized image, and the first neural network may be generated. The first neural network may include trained weights, and the accuracy of the trained weights may not be high. That is, the performance of the first neural network may not be improved. Accordingly, in the second training process, training based on second training data based on a real image may be further performed as described above, and the trained neural network $NN_T$ with high performance may be obtained.

In addition, the training of the neural network described above may be performed by a computing device in the manufacturing process of a device to which the trained neural network $NN_T$ is applied, such as an image sensor 100 (see FIG. 1), and for example, the computing device may include a processor and a memory. The memory may store the training data and operation parameters. The processor may train the initial neural network $NN_{INI}$ by performing operation and verification based on the training data.

Figure 7A:
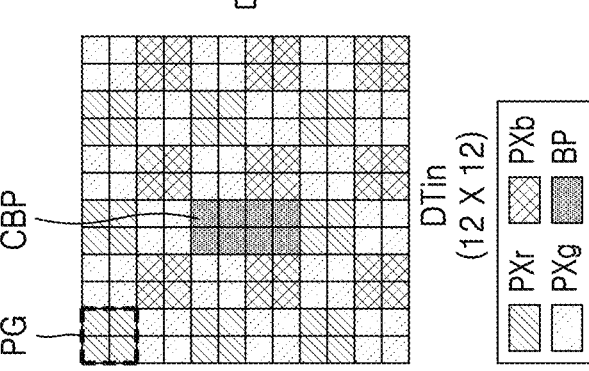
Figure 7B:
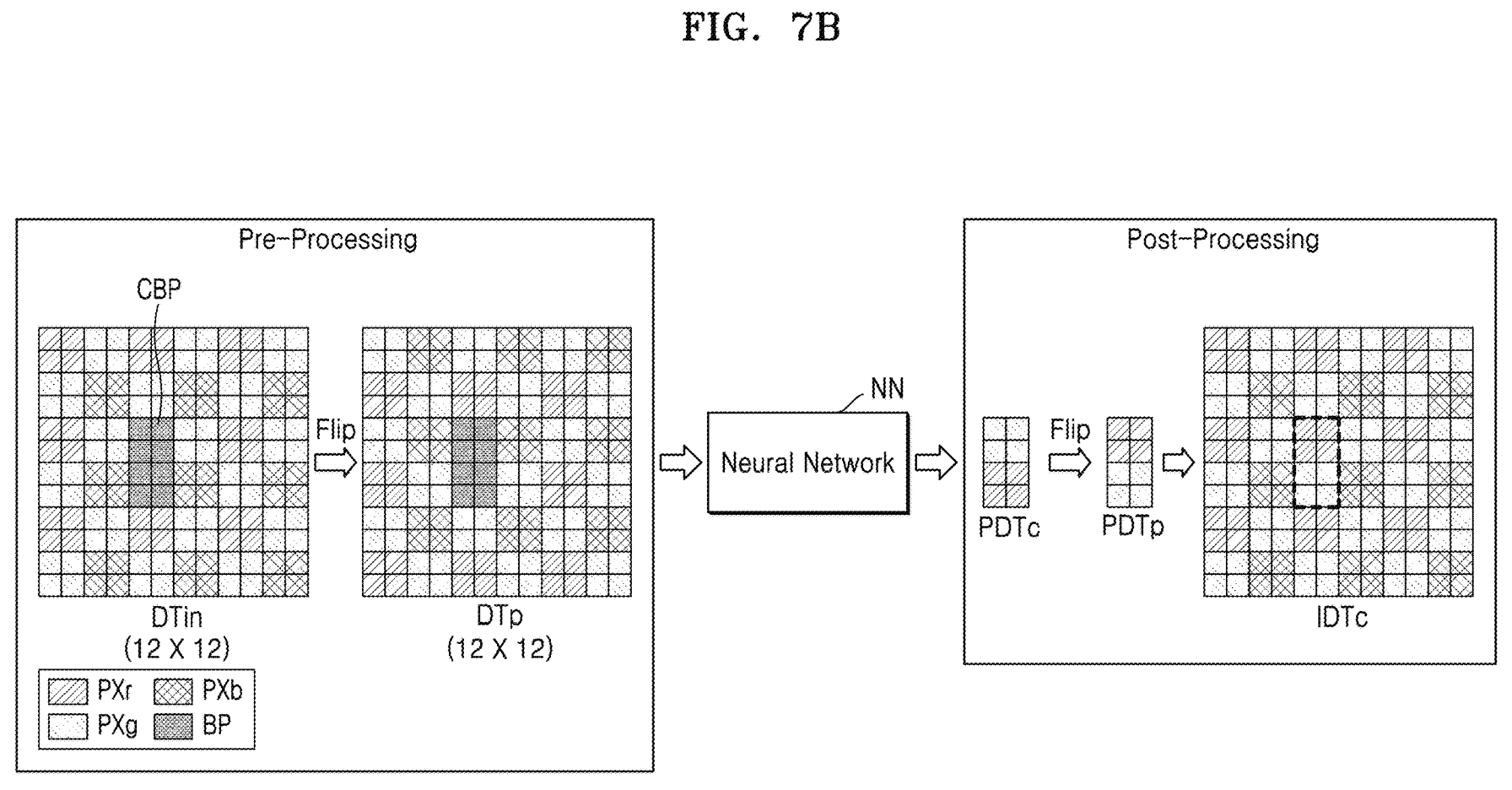
Figure 7C:
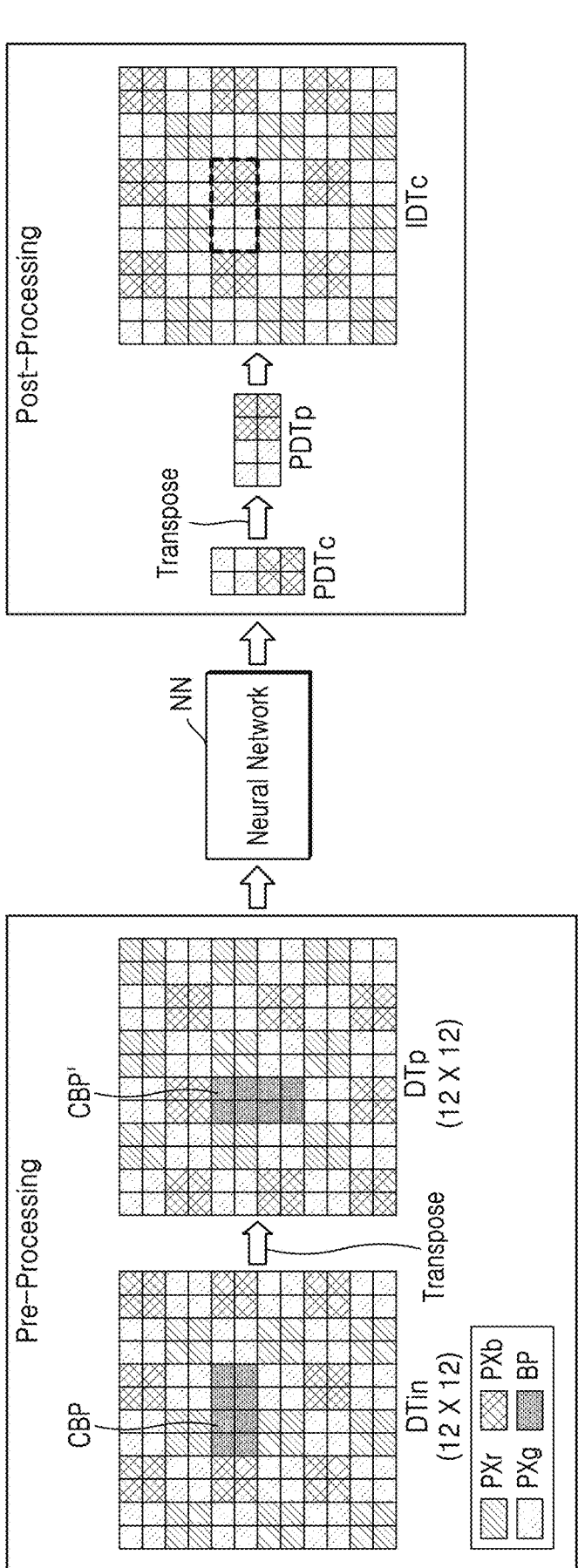
Figure 7D:
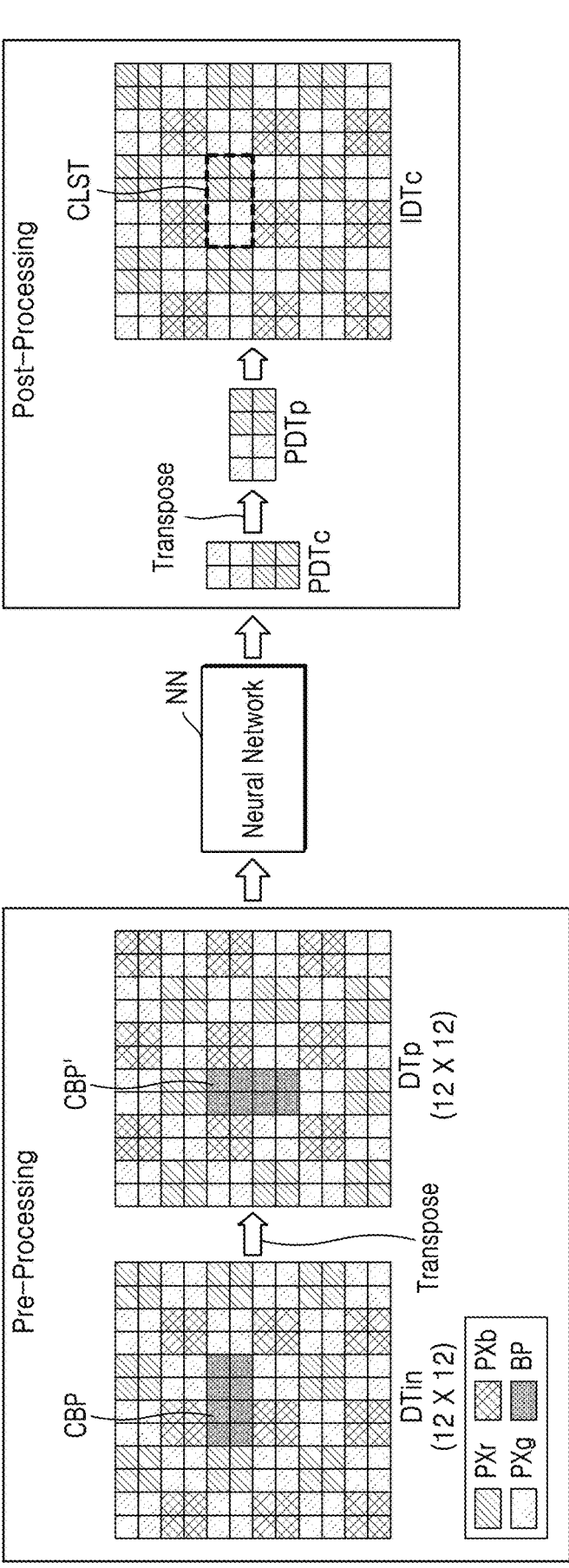

FIGS. 7A, 7B, 7C, and 7D illustrate operations of a bad-pixel corrector according to embodiments. The embodiments of FIGS. 7A, 7B, 7C, and 7D may be performed by the bad-pixel corrector 20 of FIG. 1. FIG. 7A illustrates a case where the input data DTin is suitable for the neural network NN to process, and FIGS. 7B to 7D illustrate cases where the input data DTin is not suitable for the neural network NN to process.

Referring to FIG. 7A, the input data DTin may include a tetra pattern. Pixels of the same color in a 2×2 matrix are included in a pixel group PG. The input data DTin may include eight bad pixels BP arranged in a 4×2 matrix, that is, a cluster bad pixel CBP, and pixels around the cluster bad pixel CBP. The input data DTin may include a pixel group PG of a 6×6 matrix and, accordingly, may include pixels in a 12×12 matrix.

The neural network NN may include a neural network model trained to correct the cluster bad pixel CBP based on training data including the same cluster bad pixel CBP as the cluster bad pixel CBP of the input data DTin. As described above, the neural network model may include a plurality of fully connected layers, while excluding convolutional layers. The neural network NN may be obtained by training based on the training data including bad pixels BP (clustered bad pixels) in a 4×2 matrix.

In the case illustrated in FIG. 7A, the input data DTin is suitable for being processed by the neural network NN. Therefore, the bad-pixel corrector 20 may input the input data DTin to the neural network NN, and the neural network NN may generate the corrected pixel data PDTc by operating based on the input data DTin. The bad-pixel corrector 20 may generate the corrected image data IDTc by applying the corrected pixel data PDTc to image data. For example, the bad-pixel corrector 20 may apply pixel values of pixels included in the corrected pixel data PDTc as pixel values of pixels corresponding to the cluster bad pixel CBP. Accordingly, the bad-pixel corrector 20 may correct the cluster bad pixel CBP of the image data IDT.

Referring to FIGS. 7B to 7D, the input data DTin is not suitable for being processed by the neural network NN, and accordingly, the bad-pixel corrector 20 may perform pre-processing on the input data DTin to generate the pre-processed input data DTp that may be processed by the neural network NN, and the pre-processed input data DTp may be input to the neural network NN.

Referring to FIG. 7B, the input data DTin may include cluster bad pixel CBP including bad pixels BP in a 4×2 matrix. However, in the input data DTin of FIG. 7A, four bad pixels BP arranged in an upper portion, among eight bad pixels BP included in the cluster bad pixel CBP, correspond to the green pixels PXg, and four bad pixels BP arranged in a lower portion, among the eight bad pixels BP may correspond to the blue pixels PXb (non-green pixels). On the other hand, in the input data DTin of FIG. 7B, four bad pixels BP arranged in an upper portion, among the eight bad pixels BP included in the cluster bad pixel CBP, correspond to the red pixels PXr, and four bad pixels BP arranged in a lower portion among the eight bad pixels BP may correspond to the green pixels PXg.

According to an embodiment, in a pre-pre-processing operation, the bad-pixel corrector 20 may flip up and down the input data DTin to generate the pre-processed input data DTp, such that the four bad pixels BP arranged in the upper portion correspond to the green pixels PXg and the four bad pixels BP arranged in the lower portion correspond to the red pixels PXr (non-green pixels). In this manner, the pre-processed input data DTp may be similar to the input data of FIG. 7A.

The neural network (NN) may include the pre-processed input data DTp, that is, the corrected pixel data PDTc obtained based on the flipped input data. The bad-pixel corrector 20 may perform post-processing corresponding to the pre-processing on the corrected pixel data PDTc. The bad-pixel corrector 20 may flip up and down the corrected pixel data PDTc to generate post-processed pixel data PDTp. Four pixels in an upper portion of the corrected pixel data PDTc may correspond to the green pixels PXg, and four pixels in a lower portion of the corrected pixel data PDTc may correspond to the red pixels PXr, and four pixels in an upper portion of the post-processed pixel data PDTp generated as the corrected pixel data PDTc is flipped may correspond to the red pixels PXr, and four pixels in a lower portion of the post-processed pixel data PDTp may correspond to the green pixels PXg.

The bad-pixel corrector 20 may generate the corrected image data IDTc by applying the post-processed pixel data PDTp to the image data IDT.

Referring to FIG. 7C, the input data DTin may include a cluster bad pixel CBP including bad pixels BP in a 2×4 matrix. The bad-pixel corrector 20 may transpose the input data DTin to generate the pre-processed input data DTp. The pre-processed input data DTp may include a cluster bad pixel CBP' including bad pixels BP in a 4×2 matrix. In the cluster bad pixel CBP' included in the pre-processed input data DTp, four bad pixels BP in an upper portion may correspond to the green pixels PXg, and four bad pixels BP in a lower portion may correspond to the blue pixels PXb (non-green pixels), and the pre-processed input data DTp may be the same as the input data DTin of FIG. 7A.

The pre-processed input data DTp may be provided to the neural network NN. The neural network NN may generate the corrected pixel data PDTc based on the pre-processed input data DTp. The bad-pixel corrector 20 may transpose the corrected pixel data PDTc to generate post-processed pixel data PDTp. The post-processed pixel data PDTp may include corrected pixels in a 2×4 matrix. The bad-pixel corrector 20 may generate the corrected image data IDTc by applying the post-processed pixel data PDTp to the image data IDT.

Referring to FIG. 7D, the input data DTin may include a cluster bad pixel CBP including bad pixels BP in a 2×4 matrix. The bad-pixel corrector 20 may transpose the input data DTin to generate the pre-processed input data DTp. The pre-processed input data DTp may include a cluster bad pixel CBP' including bad pixels BP in a 4×2 matrix. In the cluster bad pixel CBP' included in the pre-processed input data DTp, four bad pixels BP in an upper portion may correspond to the green pixels PXg, and four bad pixels BP in a lower portion may correspond to the red pixels PXr (non-green pixels). In the input data DTin of FIG. 7A, the four bad pixels BP in the upper portion of the cluster bad pixel CBP may correspond to the green pixels PXg, and the four bad pixels BP in the lower portion of the cluster bad pixel CBP may correspond to the green pixels PXg (non-green pixel). However, the neural network NN may equally process the red pixels PXr and the blue pixels PXb as non-green pixels.

The bad-pixel corrector 20 may transpose the corrected pixel data PDTc to generate post-processed pixel data PDTp. The post-processed pixel data PDTp may include corrected pixels in a 2×4 matrix. The bad-pixel corrector 20 may generate the corrected image data IDTc by applying the post-processed pixel data PDTp to the image data IDT.

Figure 8A:
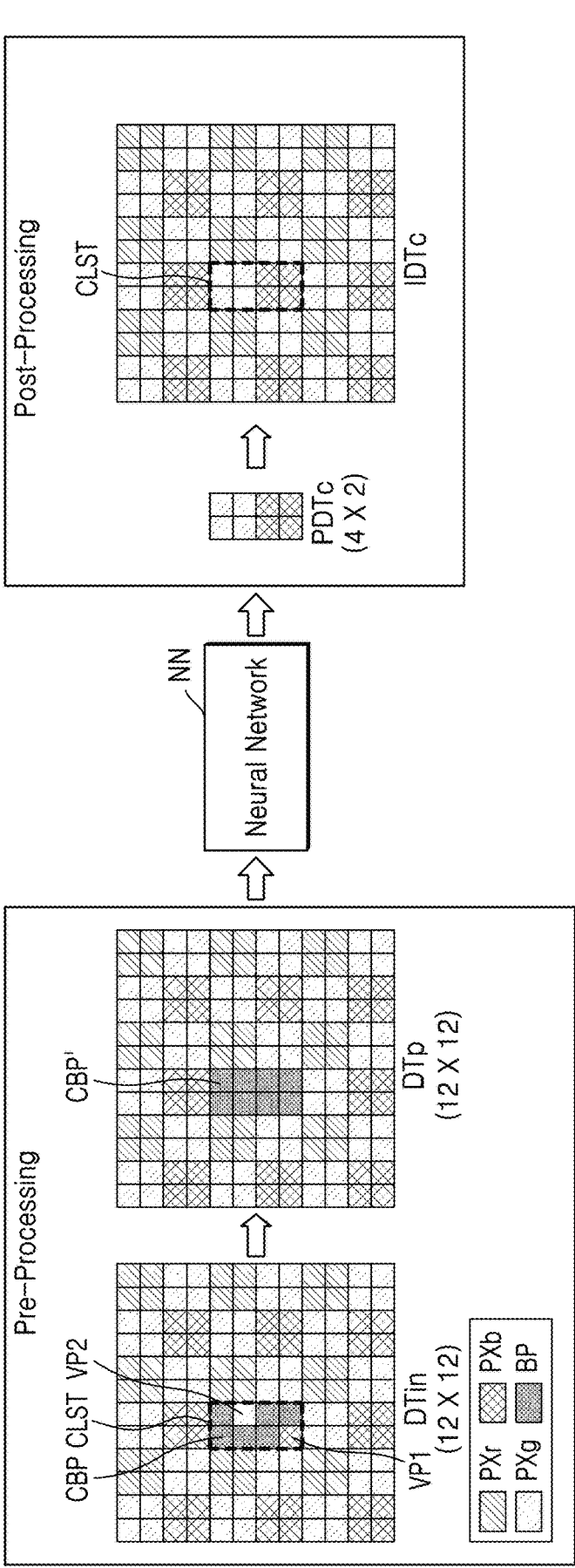
FIGS. 8A and 8B illustrate operations of a bad-pixel corrector according to an embodiment.
Figure 8B:
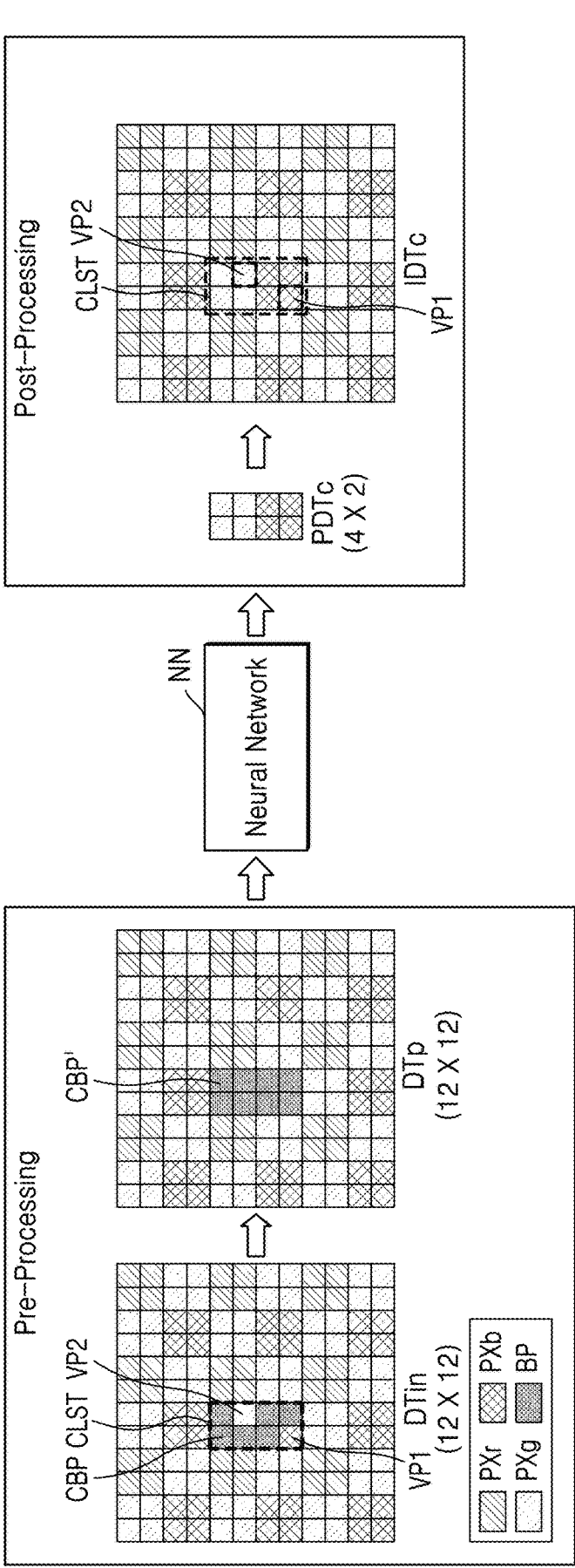

FIGS. 8A and 8B illustrate operations of a bad-pixel corrector according to embodiments. The embodiments of FIGS. 8A and 8B may be performed by the bad-pixel corrector 20 of FIG. 1.

Referring to FIG. 8A, the input data DTin may include a cluster bad pixel CBP, and the cluster bad pixel CBP may include a plurality of bad pixels BP included in a cluster CLST of a 4×2 matrix. As illustrated in FIG. 8A, in an example case in which there are valid pixels, such as a first valid pixel VP1 and a second valid pixel VP2, in the cluster CLST of the 4×2 matrix, the bad-pixel corrector 20 removes the valid pixels. That is, the bad-pixel corrector 20 may generate pre-processed input data DTp by processing the valid pixels as bad pixels. In the pre-processed input data DTp, the cluster bad pixel CBP may include bad pixels BP arranged in a 4×2 matrix.

The bad-pixel corrector 20 may provide the pre-processed input data DTp to the neural network NN. The neural network NN may generate corrected pixel data PDTc based on the pre-processed input data DTp. The corrected pixel data PDTc may include corrected pixels arranged in a 4×2 matrix. The bad-pixel corrector 20 may generate corrected image data IDTc by applying the corrected pixel data PDTc to the cluster CLT of the input data IDT.

Referring to FIG. 8B, the bad-pixel corrector 20 may apply the corrected pixel data PDTc to the input data IDT and recover the valid pixels, such as the first valid pixel VP1 and the second valid pixel VP2. For example, in the corrected image data IDTc to which the corrected pixel data PDTc is applied, pixel values before correction may be applied to the pixels corresponding to the valid pixels. For example, a pixel value of the first valid pixel VP1 and a pixel value of the second valid pixel VP2 may be applied to pixels in the corrected image data IDTc corresponding to the first valid pixel VP1 and the second valid pixel VP2 in the cluster CLST of the input data DTin. Accordingly, the first valid pixel VP1 and the second valid pixel VP2 may be recovered from the corrected pixel data PDTc.

FIG. 9 illustrates an operation of a bad-pixel corrector according to an embodiment. The embodiment of FIG. 9 may be performed by the bad-pixel corrector 20 of FIG. 1.

Referring to FIG. 9, the input data DTin may include a cluster bad pixel CBP including bad pixels BP arranged in a 4×2 matrix and random bad pixels around the cluster bad pixel CBP. The random bad pixels around the cluster bad pixel CBP may include, but is not limited to, one or more bad pixels in the vicinity of cluster bad pixel CBP, one or more bad pixels adjacent to the cluster bad pixel CBP, one or more bad pixels within a reference distance from the cluster bad pixel CBP, or one or more bad pixels within a number of reference pixel from the cluster bad pixel CBP. However, the disclosure is not limited thereto, and as such, according to another embodiment, the random bad pixels around the cluster bad pixel CBP may include one or more bad pixels in the matrix of the input data DTin other than the cluster bad pixel CBP. For example, the random bad pixels may include a first random bad pixel RBP1 and a second random bad pixel RBP2. The bad-pixel corrector 20 may process the random bad pixels in advance before correcting the cluster bad pixels CBP. However, in an example case in which there is the cluster bad pixel CBP around the random bad pixels RBP1 and RBP2, it is difficult to correct the random bad pixels RBP1 and RBP2. Accordingly, the bad-pixel corrector 20 may correct the random bad pixels RBP1 and RBP2 after correcting the bad pixels of the cluster bad pixels CBP.

The bad-pixel corrector 20 may temporarily correct the first and second random bad pixels RBP1 and RBP2. For example, the bad-pixel corrector 20 may apply an average value of pixel values of pixels of the same color around the first random bad pixel RBP1 to the first random bad pixel RBP1 and may apply an average value of pixel values of pixels of the same color around the second random bad pixel RBP2 to the second random bad pixel RBP2. Accordingly, pre-processed input data DTp including the cluster bad pixels CBP and the temporarily corrected pixels TP1 and TP2 may be generated.

The bad-pixel corrector 20 may provide the pre-processed input data DTp to the neural network NN. The neural network NN may generate corrected pixel data PDTc based on the pre-processed input data DTp. The bad-pixel corrector 20 may apply the corrected pixel data PDTc to the image data IDT. Also, the bad-pixel corrector 20 may correct the first and second random bad pixels RBP1 and RBP2. For example, in correcting the first and second random bad pixels RBP1 and RBP2, pixel values of pixels corrected by bad-pixel correction of the cluster bad pixel CBP may be used. Accordingly, the corrected image data IDTc, in which the cluster bad pixel CBP and the random bad pixels RBP1 and RBP2 are corrected, may be generated.

As described above, methods by which the bad-pixel corrector 20 performs bad-pixel correction for the cluster bad pixel CBP of the input data DTin in various cases are described with reference to FIGS. 7A to 9. The methods of the embodiments of FIGS. 7A to 9 may be performed individually, and alternatively may be performed in combination.

Figure 10A:
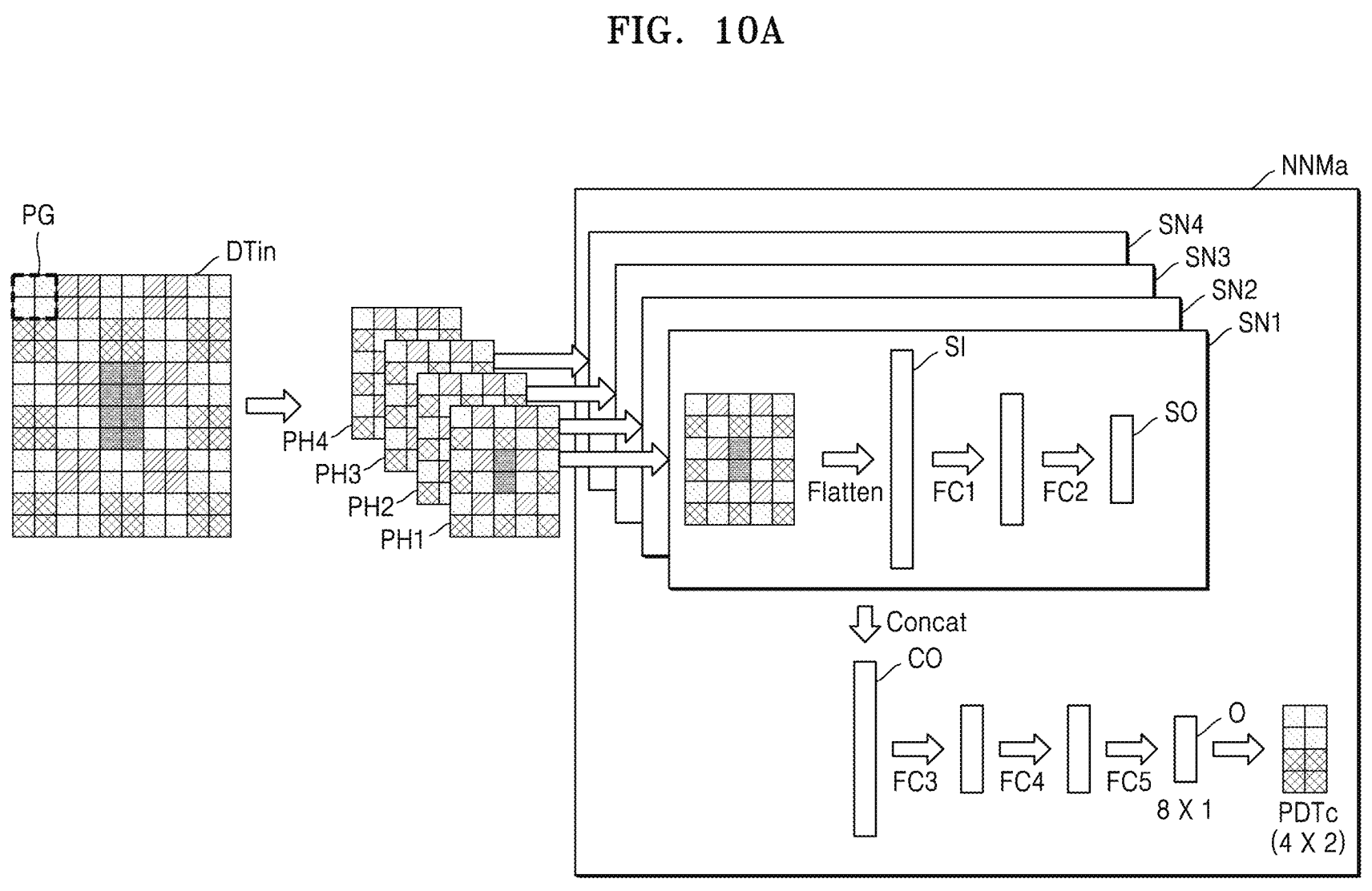
Figure 10B:
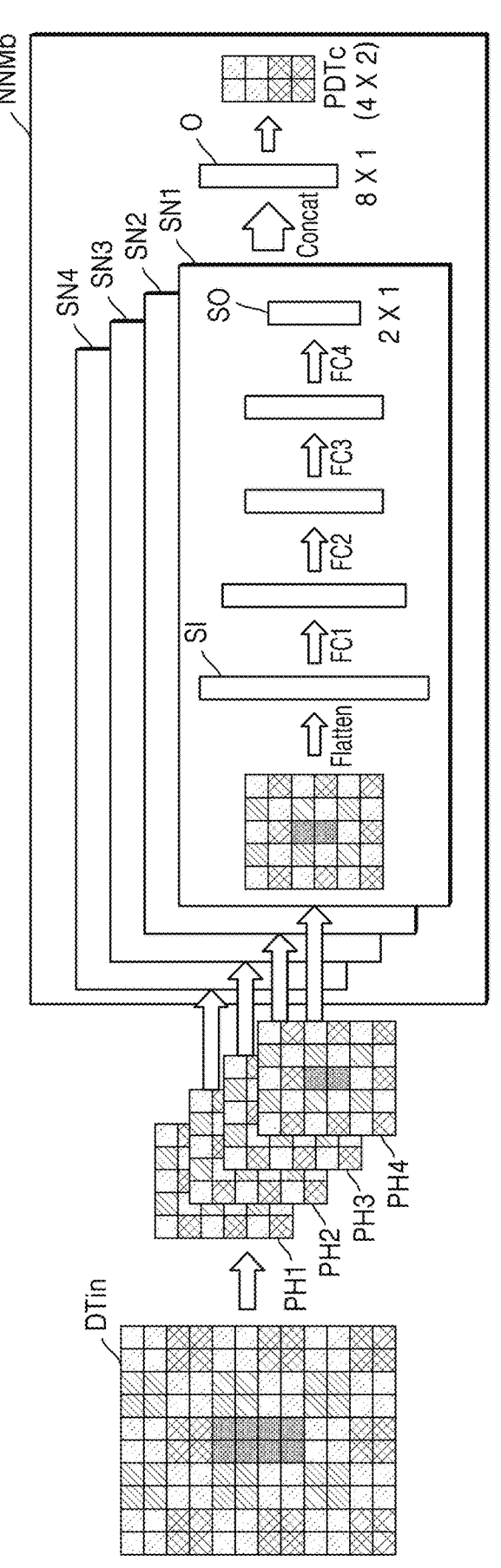

FIGS. 10A and 10B illustrate examples of neural network models according to embodiments.

Referring to FIG. 10A, a neural network model NNMa may include a plurality of sub-networks and a plurality of fully connected layers. For example, the neural network model NNMa may include a first sub-network SN1, a second sub-network SN2, a third sub-network SN3, and a fourth sub-network SN4. The plurality of sub-networks SN1 to SN4 may each include a plurality of fully connected layers, for example, a first fully connected layer FC1 and a second fully connected layer FC2. Moreover, the plurality of fully connected layers may a third fully connected layer FC3, a fourth fully connected layer FC4 and a fifth fully connected layers FC5. The third fully connected layer FC3, the fourth fully connected layer FC4 and the fifth fully connected layers FC5 may be commonly provided for the plurality of sub-networks. However, the disclosure is not limited thereto, and as such, according to another embodiment, the number of the sub-networks may be different than four. According to another embodiment, the number of fully connected layers FC may be different than five. According to another embodiment, the number of fully connected layers FC provided in each of the sub-networks may be different than two. According to another embodiment, the number of fully connected layers FC commonly provided to the sub-networks may be different than three.

The bad-pixel corrector 20 (see FIG. 1) may divide the input data DTin into a plurality of sub-input data, which include pixels at the same position in each pixel group, such as first to fourth sub-input data PH1 to PH4, and may provide the plurality of sub-input data to each of the plurality of sub-networks SN1 to SN4. For example, the bad-pixel corrector 20 may generate the plurality of sub-input data by performing space to depth (S2D) conversion on the input data DTin.

For example, as illustrated in FIG. 10A, each pixel group PG may include four pixels, and the bad-pixel corrector 20 may generate first sub-input data PH1 including pixels located at an upper left of each pixel group PG, second sub-input data PH2 including pixels located at an upper right of each pixel group PG, third sub-input data PH3 including pixels located at an lower left of each pixel group PG, and fourth sub-input data PH4 including pixels located at an lower right of each pixel group PG. The bad-pixel corrector 20 may provide the first sub-input data PH1 to the first sub-network SN1, the second sub-input data PH2 to the second sub-network SN2, the third sub-input data PH3 to the third sub-network SN3, and the fourth sub-input data PH4 to the fourth sub-network SN4.

The plurality of sub-networks SN1 to SN4 may be operated respectively based on the plurality of sub-input data. For example, the first sub-input data PH1 may be flattened and generated as a one-dimensional sub-input SI including a plurality of pixel values. The sub-input SI may be input to the first fully connected layer FC1, and a sub-output SO may be generated by the first fully connected layer FC1 and the second fully connected layer FC2. Sub-outputs SO of the plurality of sub-networks SN1 to SN4 may be concatenated to generate a combined output CO, and the combined output CO may be input to the third fully connected layer FC3. An output O including pixel values of pixels arranged in an 8×1 matrix may be generated by the plurality of fully connected layers FC3 to FC5, and the output O may be converted into corrected pixel data PDTc.

Referring to FIG. 10B, a neural network model NNMb may include a plurality of sub-networks SN1 to SN4, for example, first, second, third, and fourth sub-networks SN1, SN2, SN3, and SN4, and the plurality of sub-networks SN1 to SN4 may each include a plurality of fully-connected layers FC1 to FC4, for example, first, second, third, and fourth fully-connected layers FC1, FC2, FC3, and FC4. The plurality of sub-networks SN1 to SN4 may be operated respectively based on the plurality of sub-input data. For example, the first sub-input data PH1 may be flattened and generated as a one-dimensional sub-input SI including a plurality of pixel values. The sub-input SI may be input to the first fully connected layer FC1, and a sub-output SO including pixel values of pixels arranged in a 8×1 matrix may be generated by the plurality of fully connected layers FC1 to FC. Sub-outputs SO of the plurality of sub-networks SN1 to SN4 may be concatenated to generate an output O including pixel values of pixels arranged in an 8×1 matrix, and the output O may be converted into corrected pixel data PDTc.

As described above with reference to FIGS. 10A and 10B, the neural network models NNMa and NNMb may each include a plurality of sub-networks, each of which includes a plurality of fully connected layers, and a plurality of sub-input data including pixels corresponding to respective phases of the input data DTin may be executed in parallel by the plurality of sub-networks. Accordingly, the processing speed of the bad-pixel corrector 20 to which the neural network model NNMa or NNMb is applied may be increased.

Figure 11:
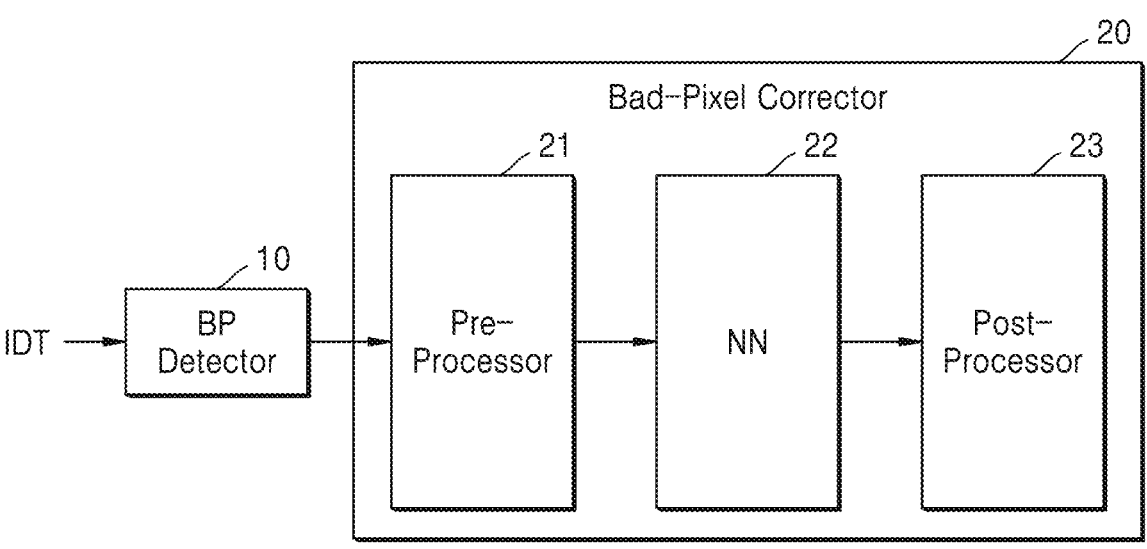
FIG. 11 is a block diagram schematically illustrating a bad-pixel corrector according to an embodiment.

FIG. 11 is a block diagram schematically illustrating a bad-pixel corrector according to an embodiment. For the sake of convenience of description, a bad-pixel detector 10 is also illustrated.

Referring to FIG. 11, the bad-pixel corrector 20 may include a pre-processor 21, a neural network 22, and a post-processor 23.

The pre-processor 21 may generate input data including a cluster bad pixel. For example, as described above with reference to FIGS. 7C, 7D, 8A, 7B, 9A and 9B, the pre-processor 21 may generate pre-processed input data or a plurality of sub-input data by performing pre-processing on the input data.

The neural network 22 may include a neural network model including a plurality of layers. The plurality of layers may include a plurality of fully connected layers, while excluding a convolutional layer. In an embodiment, the neural network 22 may include a plurality of sub-networks including a plurality of fully connected layers.

The post-processor 23 may generate post-processed pixel data by post-processing the corrected pixel data generated by the neural network 22 and generate the corrected image data by applying the post-processed pixel data to image data. In an embodiment, the post-processor 23 may correct a cluster bad pixel by applying the corrected pixel data to the image data, and may recover one or more valid pixels included in a cluster or perform bad-pixel correction on one or more random pixels around the cluster bad pixel.

Figure 12:
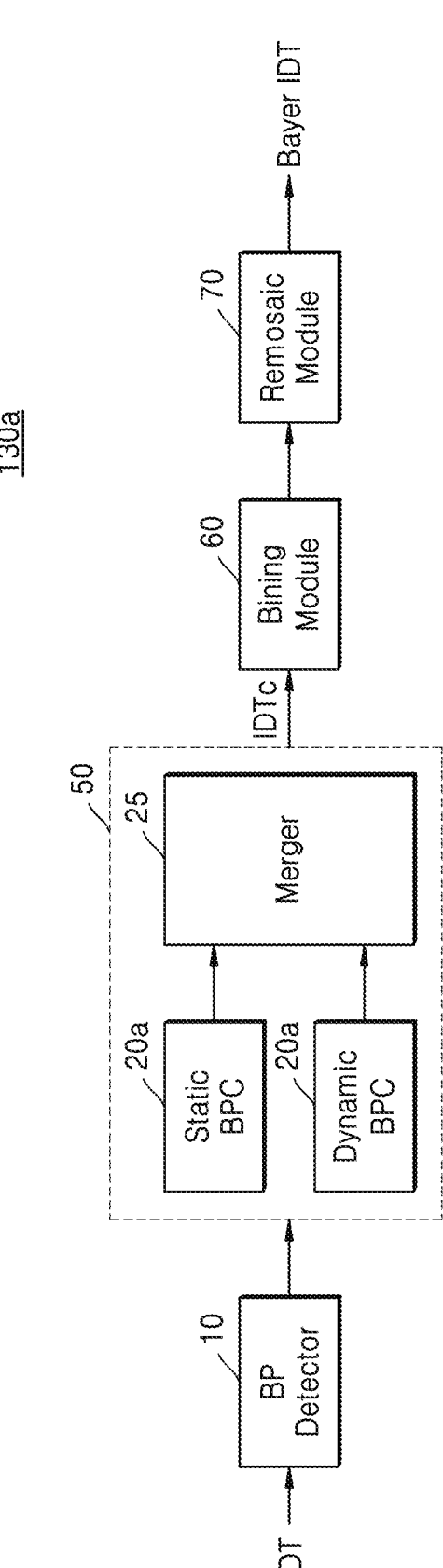
FIG. 12 illustrates an example implementation of an image processor according to an embodiment.

FIG. 12 illustrates an implementation example of an image processor according to an embodiment.

Referring to FIG. 12, an image processor 130a may include a bad-pixel detector (BP detector) 10, a correction module 50, a binning module 60, and a remosaic module 70. The correction module 50 may include a static bad-pixel corrector (static BPC) 20a, a dynamic bad-pixel corrector (dynamic BPC) 20b, and a merger 25.

The bad-pixel detector 10 may detect a bad pixel from the received image data IDT and determine the type of the bad pixel. For example, the pixel detector 10 may detect whether the bad pixel is a static bad pixel or a dynamic bad pixel, whether the static bad pixel includes a cluster bad pixel, whether a valid pixel is included in a cluster including the cluster bad pixel, whether there is a random bad pixel around the cluster bad pixel, and so on. However, the disclosure is not limited thereto, and as such, the pixel detector 10 may perform other detection. For example, the bad-pixel detector 10 may detect a color or a color channel in which a static bad pixel occurs. That is, the bad-pixel detector 10 may determine in which channel the static bad pixel occurs among a green channel, a blue channel, and a red channel. The bad-pixel detector 10 may generate bad-pixel information including, but not limited to, the type of a bad pixel, whether a cluster includes a valid pixel, whether the cluster includes a random pixel, and so on.

In an example case in which the bad-pixel detector 10 detects a static bad pixel, the image data IDT (or some pieces of the image data which include a static bad pixel) may be provided to the static bad-pixel corrector 20a (hereinafter referred to as a static BPC). In an embodiment, the bad-pixel information generated by the bad-pixel detector 10 may be provided to the bad-pixel corrector 20a along with the image data IDT.

The bad-pixel corrector 20 described with reference to FIGS. 1 to 11 may be applied as the static BPC 20a. The static BPC 20a may correct a cluster bad pixel of input data, based on deep learning. A neural network model applied to the deep learning of the static BPC 20a may include a plurality of layers excluding a convolutional layer, such as a plurality of fully connected layers. In an embodiment, the static BPC 20a may perform pre-processing on input data and then perform post-processing for applying the corrected pixel data to image data after the corrected pixel data is generated by deep learning based on the pre-processed input data.

In an example case in which the bad-pixel detector 10 detects a dynamic bad pixel, the image data IDT (or some pieces of the image data which include a dynamic bad pixel) may be provided to the dynamic bad-pixel corrector 20b (hereinafter referred to as a dynamic BPC). The dynamic BPC 20a may correct a bad pixel that unexpectedly occurs in the image data IDT. That is, the dynamic BPC 20a may generate pixel data corresponding to the bad pixel.

The merger 25 may merge partial image data received from the static BPC 20a and the dynamic BPC 20b into corrected image data. The merger 25 may replace a static bad pixel of the image data IDT with corrected pixel data output from the static bad-pixel corrector 20a and may replace a dynamic bad pixel of the image data IDT with the corrected pixel data output from the dynamic bad-pixel corrector 20b. Accordingly, the image data in which bad pixels are corrected may be generated.

In an embodiment, the correction module 50 may further include a component that performs another type of correction. For example, the correction module 50 may further include a denoiser to remove noise from the image data IDT.

The binning module 60 may reduce the resolution of image data by binning the received image data. For example, the binning module 60 may reduce the resolution of image data by binning the corrected image data IDTc. The binning module 60 may reduce the resolution of input image data in various ways.

The remosaic module 70 may change input image data into a Bayer pattern. As described above, the image data IDT output from the readout circuit 120 (see FIG. 1) may include a super Bayer pattern. Accordingly, the image data received by the remosaic module 70 may also include a super Bayer pattern. For example, the corrected image data or the image data with reduced resolution after correction received by the remosaic module 70 may also include a super Bayer pattern. The remosaic module 70 may perform remosaic processing on the input image data including a super Bayer pattern and change the remosaic-processed image data into image data including a Bayer pattern. Accordingly, the image data (Bayer IDT) of the Bayer pattern may be generated. The image data (Bayer IDT) of the Bayer pattern may be image-processed additionally or may be compressed and transmitted to an external processor.

In an embodiment, the binning module 60 and/or the remosaic module 70 may be included in the external processor. Accordingly, the corrected image data output from the correction module 50 may also be provided to the external processor.

Figure 13:
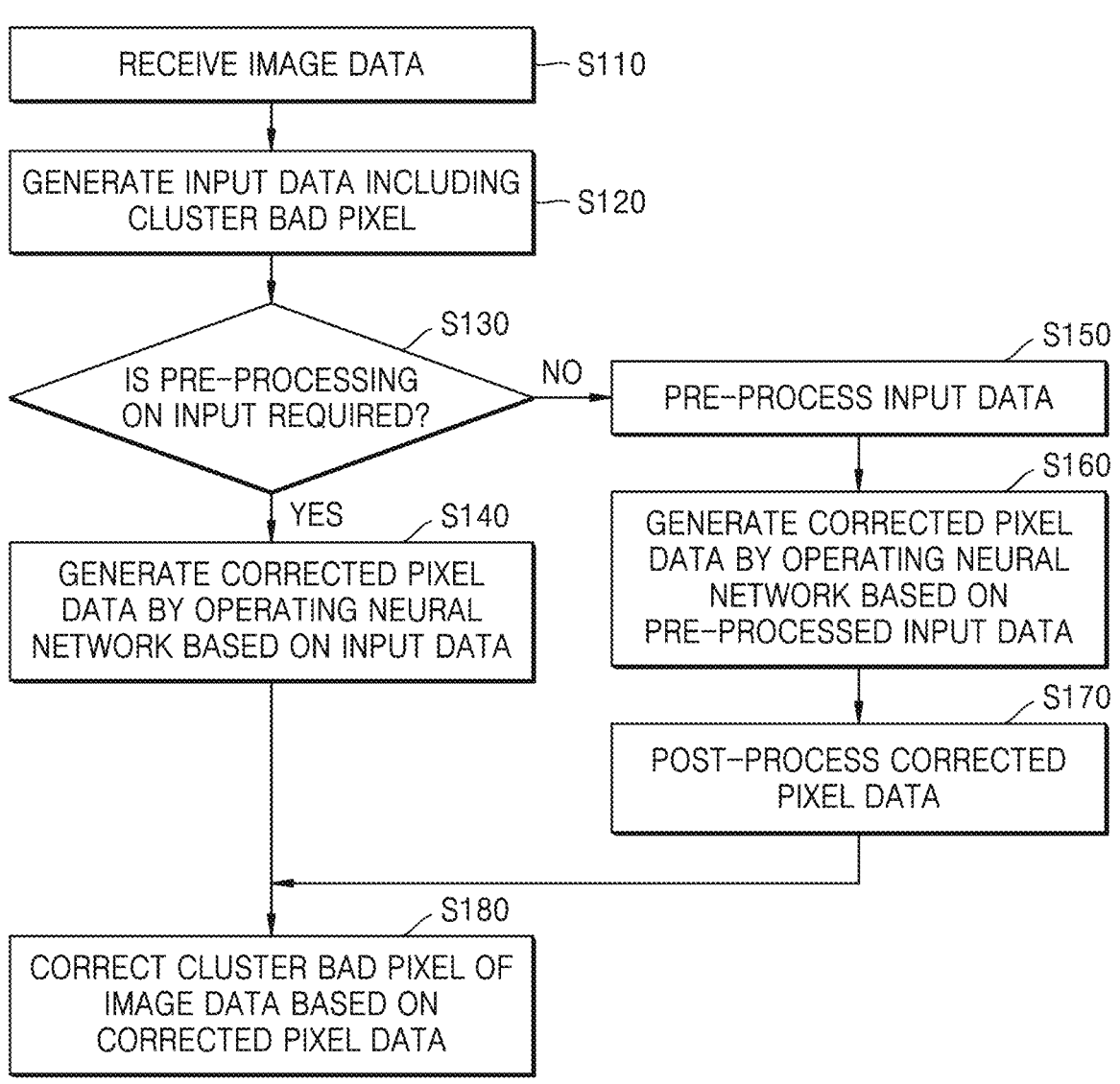
FIG. 13 is a flowchart illustrating an operating method of a bad-pixel corrector according to an embodiment.

FIG. 13 is a flowchart illustrating an operating method of a bad-pixel corrector according to an embodiment.

Referring to FIG. 13, in operation S110, the method may include receiving image data including a cluster bad pixel, and in operation S120, the method may include generating input data including a cluster bad pixel based on the image data. For example, a bad-pixel corrector 20 (see FIGS. 1 and 11) may receive image data (or partial image data) including a cluster bad pixel and generate input data including a cluster bad pixel. For example, the input data may include the cluster bad pixel and a plurality of pixel groups around the cluster bad pixel. The cluster bad pixel may be located in a center of the input data.

In operation S130, the method may include determining whether pre-processing is required for the input data. For example, the bad-pixel corrector 20 may determine whether pre-processing is required for the input data. For example, the image data may include a super Bayer pattern divided into a plurality of pixel groups, and each pixel group may include pixels of the same color arranged in a 2×2 matrix. A neural network applied to the bad-pixel corrector 20 may be trained to correct a cluster bad pixel including bad pixels arranged in a 4×2 matrix.

In an example case in which the cluster bad pixel of the input data include bad pixels arranged in a 4×2 matrix, the bad-pixel corrector 20 may determine that the input data does not require pre-processing. In an example case in which the bad-pixel corrector 20 determines that the input data is unsuitable for being processed by a neural network, the bad-pixel corrector 20 may determine that pre-processing of the input data is required. The example case in which the bad-pixel corrector 20 determines that the input data is unsuitable for being processed by a neural network may include, but is not limited to, a case in which the cluster bad pixel of the input data includes bad pixels arranged in a 2×4 matrix, a case in which some pixels in a cluster including pixels arranged in a 4×2 matrix include a valid pixel, or a case in which there is a random pixel around the cluster bad pixel.

In operation S140, the method may include generating corrected pixel data based on the input data. For example, in a case in which the input data does not require pre-processing, the bad-pixel corrector 20 may operate the neural network based on the input data to generate corrected pixel data. The bad-pixel corrector 20 may provide the input data to the neural network, and the neural network may generate the corrected pixel data based on the input data.

In operation S150, the method may include pre-processing the input data. For example, in a case in which the input data requires pre-processing, the bad-pixel corrector 20 may perform the pre-processing according to the input data. For example, the bad-pixel corrector 20 may flip or transpose the input data. In an example case in which a valid pixel is included in a cluster including the cluster bad pixel arranged in a 4×2 matrix, the bad-pixel corrector 20 may process the valid pixel as a bad pixel. In an example case in which there is a random bad pixel around the cluster bad pixel, the bad-pixel corrector 20 may temporarily correct the random bad pixel. For example, the bad-pixel corrector 20 may generate a plurality of input data by distinguishing the input data for each pixel of a pixel group.

In operation S160, the method may include generating the corrected pixel data based on the pre-processed input data. For example the bad-pixel corrector 20 may generate the corrected pixel data by operating the neural network based on the pre-processed input data. The bad-pixel corrector 20 may provide the pre-processed input data to the neural network, and the neural network may generate the corrected pixel data based on the pre-processed input data. In an embodiment, the neural network may include a plurality of sub-networks, and the bad-pixel corrector 20 may provide a plurality of sub-inputs generated by pre-processing the input data to each of the plurality of sub-networks.

In operation S170, the method may include generating post-processed pixel data by performing post-processing on the corrected pixel data. For example, the bad-pixel corrector 20 may generate post-processed pixel data by performing post-processing on the corrected pixel data. The bad-pixel corrector 20 may perform post-processing corresponding to the pre-processing in operation S150. For example, the bad-pixel corrector 20 may flip or transpose the corrected pixel data.

In operation S180, the method may include correcting cluster bad pixels of image data based on the corrected pixel data or post-processed pixel data. The bad-pixel corrector 20 may correct cluster bad pixels of image data based on the corrected pixel data or post-processed pixel data. The bad-pixel corrector 20 may generate the corrected image data by applying the corrected pixel data or post-processed pixel data to the cluster bad pixels of image data. In an embodiment, the bad-pixel corrector 20 may perform post-processing on the corrected image data. In an example case in which a valid pixel is included in a cluster of the input data, and the valid pixel is processed as a bad pixel in operation S150, the bad-pixel corrector 20 may recover the valid pixel in the cluster from the corrected image data. According to an embodiment, based on a random bad pixel detected around the cluster bad pixel of the input data, and based on the random bad pixel being temporarily corrected in operation S150, the bad-pixel corrector 20 may perform bad-pixel correction on the random bad pixel in the corrected image data. For example, when there is a random bad pixel around the cluster bad pixel of the input data, and when the random bad pixel is temporarily corrected in operation S150, the bad-pixel corrector 20 may perform bad-pixel correction on the random bad pixel in the corrected image data.

Figure 14:
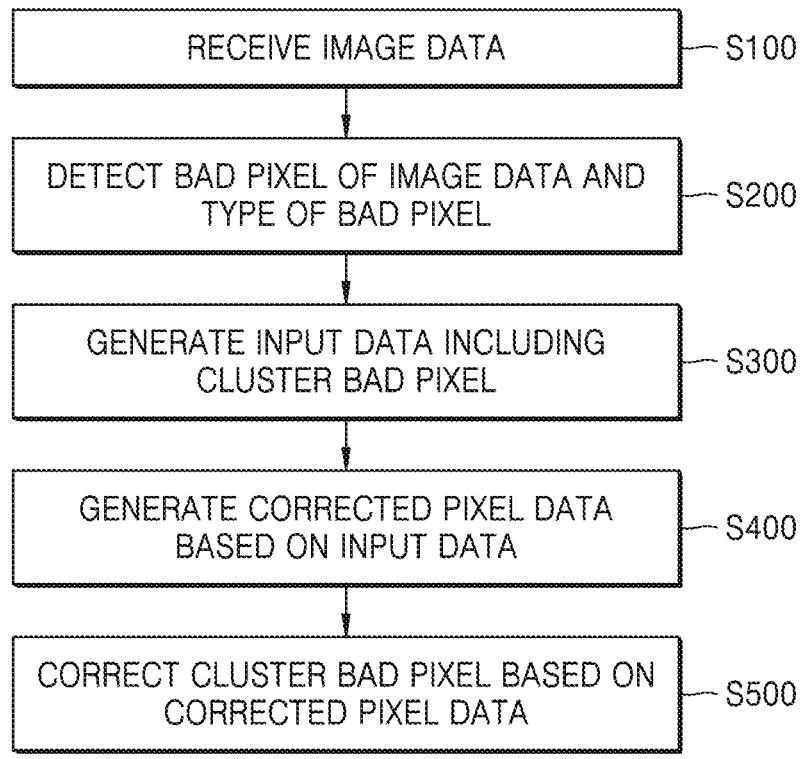
FIG. 14 is a flowchart illustrating an operating method of an image sensor, according to an embodiment.

FIG. 14 is a flowchart illustrating an operating method of an image sensor, according to an embodiment. The operating method of FIG. 14 may be performed by the image sensor 100 of FIG. 1, and the description given with reference to FIGS. 1 to 13 may be applied to the present embodiment.

Referring to FIG. 14, in operation S100, the method may include generating image data based on a received optical signal. For example, the image sensor 100 may generate image data based on a received optical signal (S100). The pixel array 110 may convert the received optical signal into a plurality of electrical signals and provides the plurality of electrical signals to the readout circuit 120, and the readout circuit 120 may generate image data based on the plurality of electrical signals.

In operation S200, the method may include detecting a bad pixel of the image data and the type of the bad pixel. For example, the image sensor 100 may detect a bad pixel of the image data and the type of the bad pixel. For example, the bad-pixel detector 10 may detect a bad pixel included in the image data and determine whether the bad pixel includes a static bad pixel (e.g., a cluster bad pixel), or a dynamic bad pixel, and in an example case in which the image data includes the cluster bad pixel, the bad-pixel detector 10 may determine the type of the cluster bad pixel, whether a valid pixel is included in a cluster where a cluster bad pixel, whether there are random pixels is included around the cluster bad pixel, and so on. Also, the bad-pixel detector 10 may determine a color channel in which a bad pixel occurs. The bad-pixel detector 10 may generate bad-pixel information according to a determination result.

In operation S300, the method may include generating input data including the cluster bad pixel. In an example case in which the image data includes a cluster bad pixel, the image sensor 100 may generate input data including the cluster bad pixel. For example, image data (or some pieces of the image data) including the cluster bad pixel is provided to the bad-pixel corrector 20, and the bad-pixel corrector 20 may generate input data including the cluster bad pixel and pixel groups around the cluster bad pixel.

In operation S400, the method may include generating corrected pixel data based on the input data. For example, the image sensor 100 may generate corrected pixel data based on the input data. The bad-pixel corrector 20 may generate the corrected pixel data by operating a neural network based on the input data. Here, the neural network may include a neural network model (a deep learning model) including a plurality of layers, and the neural network model may include a plurality of layers excluding a convolutional layer, for example, a fully connected layer. In an embodiment, the bad-pixel corrector 20 may perform pre-processing on the input data and generate the corrected pixel data based on the pre-processed input data as described above with reference to operation S130 to operation S160 of FIG. 13.

In operation S500, the method may include correcting the cluster bad pixel based on the corrected pixel data. For example, the bad-pixel corrector 20 may correct the cluster bad pixel based on the corrected pixel data. The bad-pixel corrector 20 may generate the corrected image data by applying the corrected pixel data to the cluster bad pixel. In an embodiment, the bad-pixel corrector 20 may perform post-processing on the corrected pixel data and apply the post-processed pixel data generated through the post-processing to the cluster bad pixel as described above with reference to operation S170 of FIG. 13. In an embodiment, the bad-pixel corrector 20 may perform post-processing on the corrected image data in which a cluster bad pixel is corrected and recover a valid pixel in a cluster or correct a random bad pixel.

Figure 15:
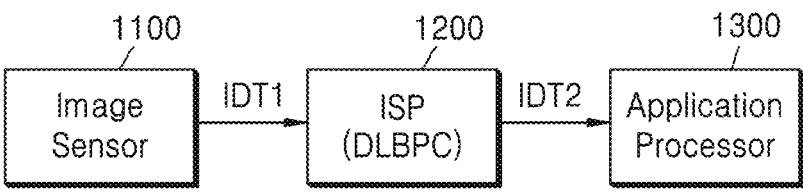
FIG. 15 is a block diagram schematically illustrating an image processing device according to an embodiment.

FIG. 15 is a block diagram illustrating an image processing device according to an embodiment.

Referring to FIG. 15, an image processing device 1000 may include an image sensor 1100, an image signal processor (ISP) 1200, and an application processor 1300. The image processing device 1000 may be referred to as an imaging device. The image sensor 1000 may include a pixel array and a readout circuit. The image sensor 1000 may output original image data as first image data IDT1.

The bad-pixel detector 10 and/or the bad-pixel corrector 20 described above with reference to FIGS. 1 to 14 may be applied to the image signal processor 1200. The image signal processor 1200 may perform deep learning-based bad-pixel correction on the first image data IDT1 including a cluster bad pixel to generate second image data IDT2 in which the cluster bad pixel is corrected. For example, the image signal processor 1200 may include a deep learning-based bad-pixel corrector (DLBPC) according to an embodiment. In another embodiment, the deep learning-based bad-pixel corrector (DLBPC) may be the image signal processor 1200.

The image signal processor 1200 may generate input data based on the first image data IDT1 and generate the second image data IDT2 based on the input data. For example, the image signal processor 1200 may generate input data including the cluster bad pixels and pixel groups around the cluster bad pixels from the first image data IDT1 and generate the second image data IDT2 by operating a neural network based on the input data. In this case, a model of a neural network may include a plurality of layers excluding a convolutional layer. For example, the model may be a neural network model or a deep learning model, which does not include a convolution layer. In an embodiment, the image signal processor 1200 may perform pre-processing on the input data before providing the input data to the neural network, and after the neural network performs operations based on the input data, the image signal processor 1200 may perform post-processing according to the pre-processing on the corrected pixel data generated as a result or may perform post-processing according to the pre-processing on the image data to which the corrected pixel data is applied.

The application processor 1300 may perform an additional operation based on the received second image data IDT2. For example, the image processing circuit may change a data format of the second image data IDT2, adjust the sharpness or contrast, or adjust a size of the second image data IDT2. In an embodiment, the application processor 1300 may include an image processing circuit that performs image processing at a higher level than the image signal processor 1200, and the image processing circuit of the application processor 1300 may perform image processing on the second image data IDT2. For example, the image processing circuit performing the image processing at a higher level may mean that the image processing circuit may perform high dynamic range (HDR) processing on a plurality of second image data IDT2 with different luminance to generate an HDR image with an increased dynamic range. However, the disclosure is not limited thereto, and as such, according to other embodiments, the image processing circuit that perform other image processing to increase a sharpness of the second image data IDT2, a contrast of the second image data IDT2, a size of the second image data IDT2 at a higher level, a resolution of the second image data IDT2, etc.

Figure 16:
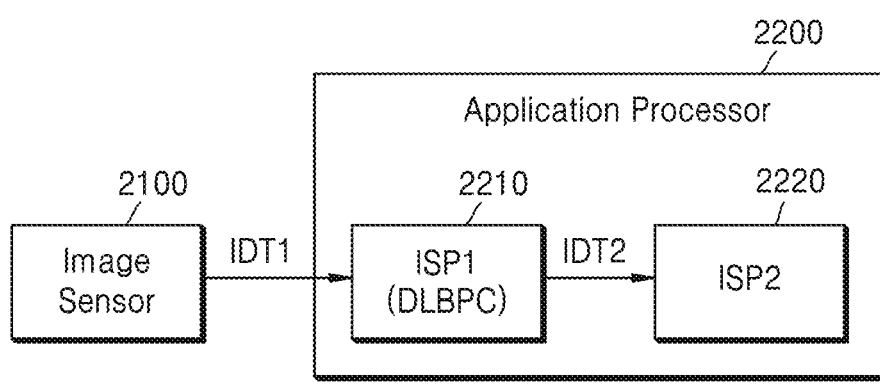
FIG. 16 is a block diagram schematically illustrating an image processing device according to an embodiment.

FIG. 16 is a block diagram illustrating an image processing device according to an embodiment.

Referring to FIG. 16, an image processing device 2000 may include an image sensor 2100 and an application processor 2200. The application processor 2200 may include a first image signal processor (ISP1) 2210 and a second image signal processor (ISP2) 2220.

The first image signal processor 2210 may receive first image data IDT1 from the image sensor 2100 and perform image processing such as bad-pixel correction and noise removal on the first image data IDT1. The bad-pixel detector 10 and/or the bad-pixel corrector 20 described above with reference to FIGS. 1 to 14 may be applied to the first image signal processor 2210. For example, the first image signal processor 2210 may include a deep learning-based bad-pixel corrector (DLBPC) according to an embodiment. In another embodiment, the deep learning-based bad-pixel corrector (DLBPC) may be the first image signal processor 2210. The first image signal processor 2210 may receive the first image data IDT1 from the image sensor 2100, perform deep learning-based bad-pixel correction on the first image data IDT1, and generate corrected second image data IDT2 in which cluster bad pixels are corrected.

The first image signal processor 2210 may generate input data based on the first image data IDT1 and generate second image data IDT2 based on the input data. For example, the first image signal processor 2210 may generate input data including the cluster bad pixels and pixel groups around the cluster bad pixels from the first image data IDT1 and generate second image data IDT2 by operating a neural network based on the input data. In this case, a model of the neural network may include a plurality of layers excluding a convolutional layer. For example, the model may be a neural network model or a deep learning model that does not include a convolutional layer. In an embodiment, the first image signal processor 2210 may perform pre-processing on the input data before the input data is provided to the neural network, and after operating the neural network, the first image signal processor 2210 may perform post-processing according to the pre-processing on the corrected pixel data generated as a result or may perform post-processing according to the pre-processing on the image data to which the corrected pixel data is applied.

The second image signal processor 2220 may perform image processing at a higher level than the first image signal processor 2210. For example, the second image signal processor 2220 may perform image processing, such as color coordinate change, brightness adjustment, sharpness adjustment, contrast adjustment, and HDR processing on the second image data IDT2.

Figure 17:
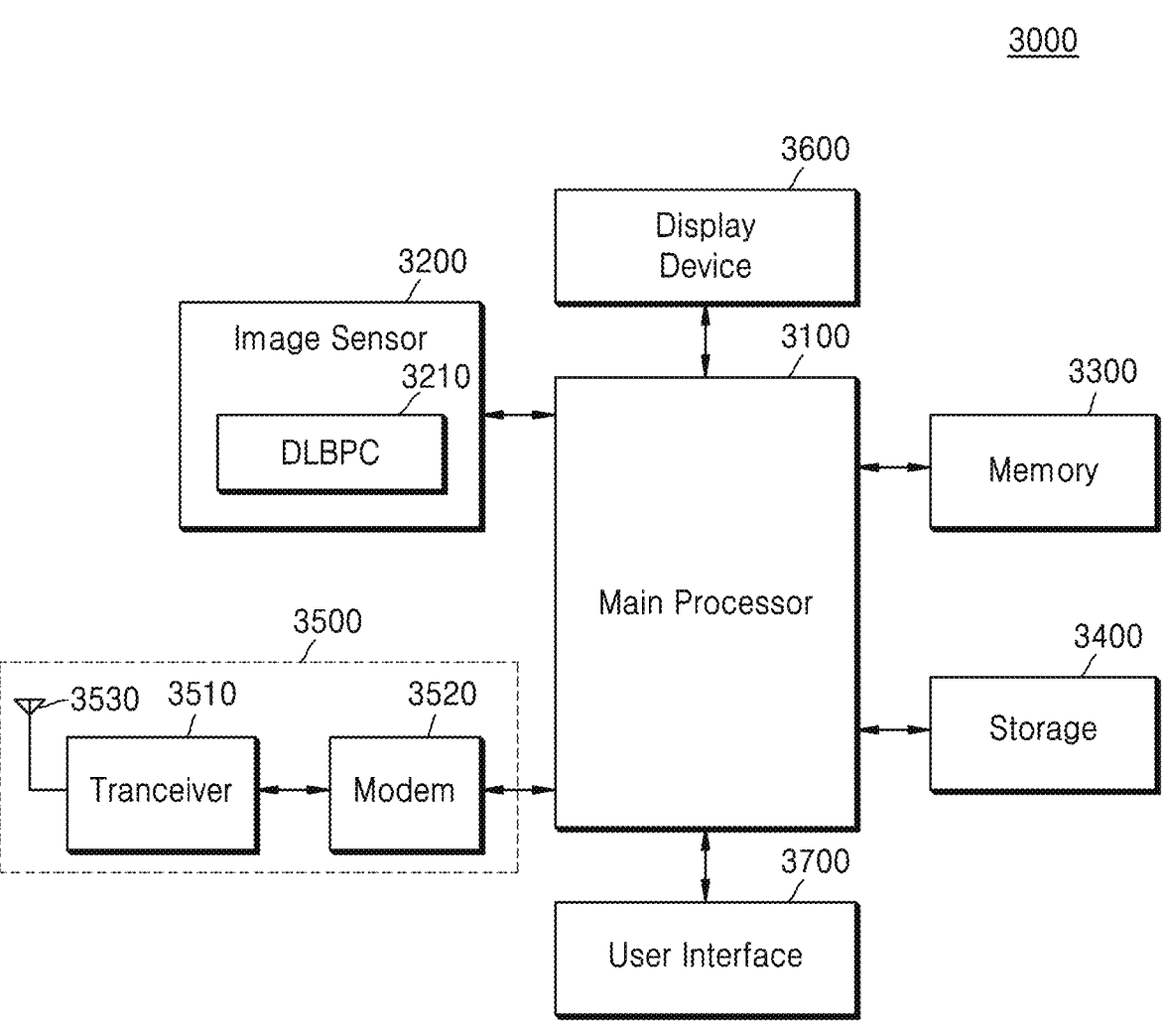
FIG. 17 is a block diagram illustrating an electronic device including an image sensor, according to an embodiment.

FIG. 17 is a block diagram illustrating an electronic device including an image sensor according to an embodiment. An electronic device 3000 of FIG. 17 may be a mobile terminal. However, the disclosure is not limited thereto, and as such, the electronic device 3000 one of a various types of electronic devices.

Referring to FIG. 17, an electronic device 3000 may include a main processor 3100, an image sensor 3200, a display device 3600, a memory 3300, a storage 3400, a user interface 3700, and a wireless transceiver 3500.

The main processor 3100 controls all operations of the electronic device 3000 and may be implemented by a system-on-chip (SoC) that executes an application program, an operating system, other types of programs or software, and so on. The main processor 3100 may provide image data provided from the image sensor 3200 to the display device 3600 or store the image data in the storage 3400. In an embodiment, the main processor 3100 may include an image processing circuit and perform image processing, such as image quality adjustment and data format change on the image data received from the image sensor 3200.

The image sensor 100 described above with reference to FIGS. 1 to 14 may be applied as the image sensor 3200. The image sensor 3200 may include a deep learning-based bad-pixel corrector (DLBPC) 3210. The bad-pixel corrector 3210 may perform deep learning-based bad-pixel correction on a cluster bad pixel occurring at a fixed position of the image data. A deep learning model (e.g., a neural network model) may include a plurality of layers excluding a convolutional layer, for example, a fully connected layer. The bad-pixel corrector 3210 may include a lightweight deep learning model trained by training data of a specific case, input the input data including cluster bad pixels to the deep learning model as it is or by pre-processing the input data, and correct the cluster bad pixels in real time.

The memory 3300 may be a working memory 3300, which may be implemented by a volatile memory, such as dynamic random access memory (DRAM) or static RAM (SRAM), or a non-volatile resistive memory, such as ferroelectric RAM (FeRAM), resistive RAM (RRAM), or phase-change RAM (PRAM). The working memory 3300 may store a program and/or data that is executed and/or processed by the main processor 3100.

The storage 3400 may be implemented by a non-volatile memory device, such as NADN flash, resistive memory, or so on, and for example, the storage 3400 may be provided as a memory card, such as a multi-media card (MMC), an embedded MMC (eMMC), or a secure digital (SD) card, or a micro SD card. The storage 3400 may store image data provided from the image sensor 3200.

The user interface 3700 may be implemented by various devices capable of receiving a user input, such as a keyboard, button key panel, a touch panel, a fingerprint sensor, and a microphone. The user interface 3700 may receive the user input and provide a signal corresponding to the received user input to the main processor 3100.

The wireless transceiver 3500 may include a transceiver 3510, a modem 3520, and an antenna 3530. The wireless transceiver 3500 may receive or transmit data from or to an external device through wireless communication.

As described above, various embodiments of the disclosure are described with reference to the drawings. In addition, although embodiments are described in the detailed description of the disclosure, the embodiments may be modified in various ways without departing from the scope of the disclosure. Therefore, the scope of the disclosure should not be limited to the above-described embodiments and may be determined by claims described below and equivalents to the claims.

While the disclosure has been particularly shown and described with reference to embodiments thereof, it will be understood that various changes in form and details may be made therein without departing from the spirit and scope of the following claims.

What is claimed is:

1. An image sensor comprising:
   a pixel array configured to convert optical signals into electrical signals;
   a readout circuit configured to convert the electrical signals into image data and output the image data; and
   a bad-pixel correction circuit configured to correct a cluster bad pixel included in the image data based on a neural network without performing a convolution operation, the neural network comprising a plurality of fully connected layers connected to each other and receiving a flattened one dimensional N1×1 matrix as an input,
   wherein a first fully connected layer, among the plurality of fully connected layers, is configured to:
      receive the flattened one dimensional N1×1 matrix,
      generate an one dimensional N2×1 matrix based on the flattened one dimensional N1×1 matrix and a first kernel, and
      output the one dimensional N2×1 matrix to a second fully connected layer, among the plurality of fully connected layers,
   wherein N1 and N2 are integers.

2. The image sensor of claim 1, wherein the plurality of fully connected layers of the neural network comprise a fully connected layer.

3. The image sensor of claim 1, wherein the bad-pixel correction circuit is further configured to:
   generate corrected pixel data corresponding to the cluster bad pixel based on input data including first bad pixels corresponding to the cluster bad pixel and pixels around the first bad pixels, and
   correct the cluster bad pixel based on the corrected pixel data,
   wherein the input data comprises:
   pixels arranged in an N×N matrix of a same color and
   a color pattern in which four pixel groups arranged in a matrix are repeatedly arranged, and
   wherein N is an integer of 2 or more.

4. The image sensor of claim 3, wherein the neural network is trained based on training data including bad pixels arranged in an M×K matrix, and
   wherein M is an integer of 2 or more and K is an integer of 2 or more.

5. The image sensor of claim 4, wherein, based on the first bad pixels corresponding to the cluster bad pixel being identical to the bad pixels in the M×K matrix included in the training data, the bad-pixel correction circuit is further configured to:
   generate the corrected pixel data by inputting the input data comprising the cluster bad pixel to the neural network, and
   replace pixel data of the cluster bad pixel with the corrected pixel data.

6. The image sensor of claim 4, wherein, based on the first bad pixels corresponding to the cluster bad pixel being different from the bad pixels in the M×K matrix included in the training data, the bad-pixel correction circuit is further configured to:
   perform pre-processing on the input data comprising the cluster bad pixel and output pre-processed input data,
   generate the corrected pixel data by inputting the pre-processed input data to the neural network,
   generate post-processed pixel data by performing post-processing on the corrected pixel data, and
   replace pixel data of the cluster bad pixel with the post-processed pixel data.

7. The image sensor of claim 6, wherein, based on the cluster bad pixel including the first bad pixels arranged in the M×K matrix, the bad-pixel correction circuit is further configured to:
   transpose the input data comprising the cluster bad pixel and output transposed input data, and
   input the transposed input data to the neural network.

8. The image sensor of claim 6, wherein, based on the cluster bad pixel including the first bad pixels arranged in an M×K matrix, and based on a color pattern of the input data being symmetrical to a color pattern of the training data in one of a first direction and a second direction, the bad-pixel correction circuit is further configured to:

flip the input data in one of the first direction and the second direction and output flipped input data; and input the flipped input data to the neural network.

9. The image sensor of claim 6, wherein, based on pixels, which are arranged in the M×K matrix including the cluster bad pixel, including at least one valid pixel, the bad-pixel correction circuit is further configured to:

pre-process the at least one valid pixel in the input data as bad pixels and output pre-processed input data, and input the pre-processed input data to the neural network.

10. The image sensor of claim 9, wherein the bad-pixel correction circuit is further configured to apply the corrected pixel data generated based on the pre-processed input data, to the image data, and recover a pixel value of at least one pixel corresponding to the at least one valid pixel to a pixel value before correction.

11. The image sensor of claim 3, wherein, based on the pixels around the cluster bad pixel including at least one second bad pixel, the bad-pixel correction circuit is further configured to:

perform pre-processing on the input data to replace a pixel value of the at least one second bad pixel with an average value of pixel values of pixels around the at least one second bad pixel and output pre-processed input data, and input the pre-processed input data to the neural network.

12. The image sensor of claim 3, wherein the bad-pixel correction circuit is further configured to:

divide the input data into N pieces of sub-input data including pixels at a same position in each pixel group, and provide the N pieces of sub-input data to each of N sub-networks of the neural network.

13. An image sensor comprising:

a pixel array configured to convert optical signals into electrical signals;

a readout circuit configured to convert the electrical signals into image data and output the image data, the image data comprising a plurality of pixel groups each comprising pixels of a same color arranged in an N×N matrix, and N being an integer of 2 or more; and an image signal processor configured to correct a cluster bad pixel occurring in at least one of the plurality of pixel groups based on a neural network without including a convolutional layer, wherein the neural network comprises a plurality of fully connected layers connected to each other and receiving a flattened one dimensional N1×1 matrix as an input, wherein a first fully connected layer, among the plurality of fully connected layers, is configured to:

receive the flattened one dimensional N1×1 matrix, generate an one dimensional N2×1 matrix based on the flattened one dimensional N1×1 matrix and a first kernel, and output the one dimensional N2×1 matrix to a second fully connected layer, among the plurality of fully connected layers, wherein N1 and N2 are integers.

14. The image sensor of claim 13, wherein the neural network includes a plurality of fully connected layers.

15. The image sensor of claim 13, wherein the image signal processor is further configured to:

pre-process input data including pixels corresponding to the cluster bad pixel and peripheral pixels around the pixels corresponding to the cluster bad pixel such that the input data is processable by the neural network and output pre-processed input data, generate corrected pixel data by applying the pre-processed input data to the neural network, and correct the cluster bad pixel based on the corrected pixel data.

16. The image sensor of claim 15, wherein, based on at least one valid pixel being included in pixels arranged in an M×K matrix comprising the cluster bad pixel, the image signal processor is further configured to pre-process the at least one valid pixel in the input data as a bad pixel, wherein M is an integer of 2 or more and K is an integer of 2 or more.

17. The image sensor of claim 15, wherein, based on the peripheral pixels including at least one bad pixel, the image signal processor is further configured to generate the pre-processed input data by correcting the at least one bad pixel based on pixel values of pixels around the at least one bad pixel.

18. The image sensor of claim 15, wherein the image signal processor is further configured to:

divide the input data into N pieces of sub-input data comprising pixels at a same position in each pixel group, and provide the N pieces of sub-input data to each of N sub-networks of the neural network.

19. An operating method of an image sensor, the operating method comprising:

generating image data based on an optical signal;

detecting a cluster bad pixel in the image data;

generating corrected pixel data, by operating a neural network without including a convolutional layer, based on input data comprising the cluster bad pixel and pixels around the cluster bad pixel; and correcting the cluster bad pixel based on the corrected pixel data, wherein the neural network comprises a plurality of fully connected layers connected to each other and receiving a flattened one dimensional N1×1 matrix as an input, and wherein the method further comprises:

by a first fully connected layer, among the plurality of fully connected layers:

receiving the flattened one dimensional N1×1 matrix, generating an one dimensional N2×1 matrix based on the flattened one dimensional N1×1 matrix and a first kernel, and outputting the one dimensional N2×1 matrix to a second fully connected layer, among the plurality of fully connected layers, wherein N1 and N2 are integers.

20. The operating method of claim 19, wherein the generating of the corrected pixel data comprises pre-processing the input data such that the input data matches training data used in training of the neural network.

* * * * *